United States Patent
Bremer et al.

(10) Patent No.: US 7,471,777 B2
(45) Date of Patent: Dec. 30, 2008

(54) INDIRECT DSL OVER LOADED AND UNLOADED LOOPS

(75) Inventors: Gordon F. Bremer, Largo, FL (US); William L. Betts, St. Petersburg, FL (US); Philip J. Kyees, Largo, FL (US)

(73) Assignee: Summit Technology Systems, LP, Bala Cynwyd, PA (US)

( * ) Notice: Subject to any disclaimer, the term of this patent is extended or adjusted under 35 U.S.C. 154(b) by 980 days.

(21) Appl. No.: 10/434,864

(22) Filed: May 8, 2003

(65) Prior Publication Data

US 2004/0042510 A1    Mar. 4, 2004

Related U.S. Application Data

(60) Provisional application No. 60/379,142, filed on May 8, 2002, provisional application No. 60/379,124, filed on May 8, 2002, provisional application No. 60/379,041, filed on May 8, 2002, provisional application No. 60/379,040, filed on May 8, 2002, provisional application No. 60/379,038, filed on May 8, 2002, provisional application No. 60/379,030, filed on May 8, 2002, provisional application No. 60/379,029, filed on May 8, 2002, provisional application No. 60/379,028, filed on May 8, 2002, provisional application No. 60/379,026, filed on May 8, 2002.

(51) Int. Cl.
*H04M 11/00* (2006.01)

(52) U.S. Cl. .................................. 379/93.08; 379/93.28

(58) Field of Classification Search .............. 379/93.08, 379/93.28, 93.31, 399.01, 400, 401; 370/535
See application file for complete search history.

(56) References Cited

U.S. PATENT DOCUMENTS

| | | | |
|---|---|---|---|
| 4,630,286 A | 12/1986 | Betts | 375/39 |
| 4,637,035 A | 1/1987 | Betts | 375/8 |
| 4,734,920 A | 3/1988 | Betts | 375/8 |
| 5,134,633 A | 7/1992 | Werner | 375/38 |
| 5,163,066 A | 11/1992 | Cupo et al. | 375/14 |
| 6,026,120 A | 2/2000 | Betts | 375/261 |
| 6,111,936 A | 8/2000 | Bremer | 379/28 |
| 6,307,893 B1 | 10/2001 | Bremer et al. | 375/296 |
| 6,408,056 B1 | 6/2002 | Bremer et al. | 379/93 |

(Continued)

OTHER PUBLICATIONS

ITU-T G.992.2; Splitterless Asymmetric Digital Subscriber Line (ADSL) transceivers; International Telecommunication Union; Jun. 1999; pp. 1-174.

(Continued)

*Primary Examiner*—Stella L Woo
(74) *Attorney, Agent, or Firm*—Woodcock Washburn LLP

(57) ABSTRACT

Indirect digital subscriber line (DSL) service generally involves connecting conversion equipment that converts between DSL service delivered to a customer premises and DSL service that connects back to a data network. Indirect DSL service may be delivered on the same loop to the customer premises that also carries a native 0-4 KHz POTS interface. For larger deployments, the conversion equipment may include inverse multiplexing to combine multiple links back to the data network to support DSL service. Furthermore, the conversion equipment may include functions to digitize the POTS service. Aggregating DSL data from multiple customers and/or digitizing POTS service that may be multiplexed with the DSL data allows for significant pair gain opportunities.

22 Claims, 16 Drawing Sheets

U.S. PATENT DOCUMENTS

| | | | |
|---|---|---|---|
| 6,414,964 | B1 | 7/2002 | Holmquist et al. .......... 370/449 |
| 6,580,785 | B2 | 6/2003 | Bremer et al. ................ 379/88 |
| 6,658,096 | B2 | 12/2003 | Bremer et al. ................ 379/93 |
| 6,715,124 | B1 | 3/2004 | Betts .......................... 714/792 |
| 2003/0039348 | A1 | 2/2003 | Bremer et al. .............. 379/220 |
| 2003/0169780 | A1* | 9/2003 | Kukic ......................... 370/535 |

OTHER PUBLICATIONS

ITU-T V.34; A modem operating at data signalling rates of up to 33,600 bit/s for use on the general switched telephone network and on leased point-to-point 2-wire telephone-type circuits; International Telecommunication Union; Feb. 1998; pp. i-iv, 1-72.

T1E1.4/2002-85; Performance of LE-ADSL on modified loaded loops longer than 18 kft; 2Wire, Inc.; Feb. 18-22, 2002; pp. 1-6.

T1E1.4/2002/86; LE-ADSL on modified loaded loops longer than 18 kft; 2Wire, Inc., Feb. 18-22, 2002; pp. 1-3.

IEEE Communications Magazine, Dec. 1996; The V.34 High-Speed Modem Standard; G. David Forney, Jr., Less Brown, M. Vedat Eyuboglu, and John L. Moran, III; Dec. 1996; pp. 28-33.

ISBN 0070055920; The V Series Recommendations: Standards for Data Communications over the Telephone Network, Second Edition; Uyless Black; Copyright 1995; Chapter 5: The Voice-Band Modems Recommendation s—pp. 81-109.

* cited by examiner

INDIRECT DSL OVER LOADED AND UNLOADED LOOPS

CROSS-REFERENCE TO RELATED PATENT APPLICATIONS

This present application claims priority to several U.S. provisional applications that were all filed on May 8, 2002 and also are each incorporated by reference in their entirety herein. The U.S. provisional applications, which are incorporated by reference in their entirety herein, and to which priority is claimed, are listed by the following U.S. Ser. Nos. and titles:

60/379,124—"Loaded Loop DSL Service and Business Method"
60/379,026—"Loaded Loop DSL Modulation"
60/379,040—"Automatic Selection of Loaded Loop DSL or Standard DSL Service"
60/379,030—"Loaded Loop DSL Loop Intercession System"
60/379,029—"Automatic Switching Between Loaded Loop DSL and POTS"
60/379,038—"Multiple POTS Services on a Loaded Loop"
60/379,041—"Utilization of More Than One Loaded Loop for DSL Service"
60/379,028—"Data Communication Over Loaded Loops Simultaneous with POTS Call"
60/379,142—"Indirect Loaded Loop DSL"

Furthermore, the present application is one of three related patent applications that are being filed on the same day. The three patent applications listed by title are the following:
Ser. No. 10/435,219—"Digital Subscriber Line Service Over Loaded Loops"
Ser. No. 10/434,847—"Automatic Rapid Switching Between DSL Service and POTS Over Loaded Loops"
Ser. No. 10/434,864—"Indirect DSL Over Loaded and Unloaded Loops"

Also, the patent application 10/435,219, entitled "Digital Subscriber Line Service Over Loaded Loops", and filed the same day is incorporated by reference in its entirety herein. In addition, the patent application 10/434,847, entitled "Automatic Rapid Switching Between DSL Service and POTS Over Loaded Loops", and filed the same day is incorporated by reference in its entirety herein.

TECHNICAL FIELD

The present invention generally is related to telecommunications and, more particularly, is related to a system and method for improving the delivery of digital subscriber line (DSL) service.

BACKGROUND OF THE INVENTION

Digital Subscriber Line or Loop (DSL) communication technologies have been adopted by telephone service providers as a way of extending digital service to customer premises (CP) such as homes and offices. The advent of digital communication technology has resulted in an evolutionary change to communication systems as the facilities of switches and trunks in the networks of telecommunications service providers were converted first from analog to digital. Next, consumers wanted digital access to these digital capabilities in the network facilities of service providers. However, delivering digital services over the local loop or subscriber line facilities to cover what is often colloquially called "the last mile" to the customer premises has been more of a challenge to provision. While various mechanisms have been used to deliver digital services to customer premises, making major changes to the wiring plant that feeds subscribers generally is still prohibitively costly. For customers located near a central office (CO) or close to a digital loop carrier (DLC) system, with the generally corresponding short cable wiring runs, DSL service is often available.

However, DSL capabilities still are not available to many customers located at farther reaches from central office switches and/or digital multiplexers such as a DLC. Furthermore, the historical telephone wiring plant feeding many customer locations was designed and optimized for the analog voice frequency communications of plain old telephone service (POTS) primarily found in the 0 to 4 KHz range. (One skilled in the art will be aware that the common bandwidth for unloaded POTS loops is primarily found in the 0 to around 4 KHz range, while the common bandwidth for loaded POTS loops is primarily found in the 0 to around 3.4 KHz range. One skilled in the art will be aware of these actual bandwidth differences of loaded and unloaded loops in carrying native POTS communication even though the POTS baseband is commonly referred to as a 0-4 KHz POTS baseband. One of ordinary skill in the art will be aware that such a reference is not completely accurate for loaded loops, but is a useful shorthand when discussing the POTS baseband configurations.)

Historically, telephone companies often found it advantageous to install inductors or load coils on many local loops to optimize performance of the loops in carrying POTS voice communication. Generally, the load coils or inductors were installed in series at various points along the telephone local loop. On a properly designed local loop, load coils generally are placed on subscriber loops that are greater than or equal to 18 Kft. in length. The load coils commonly used by the Regional Bell Operating Companies (RBOCs) have 88 milli-Henrys as the standard nominal inductance value for the coils. In general, load coils are spaced along a subscriber loop beginning at approximately 3 Kft. from a line card in a CO switch or DLC chassis with additional coils generally spaced along the loop approximately each 6 Kft. thereafter. The customer end portion of a local loop generally is allowed to have lengths ranging from 3 Kft. to 12 Kft. beyond the last load coil. In general, the local loop design rules used by the RBOCs specify that three or more load coils should be used on loops that are 18 Kft. or longer in length. In some special assembly situations, such as but not limited to analog POTS loops used as trunks for a customer's PBX, the RBOCs may use load coils on loops as short as 15 Kft. in length with a minimum of two load coils.

Essentially, adding an inductor in series results in the creation of a low pass filter. While the low-pass filtering of these load coils improves performance in the 0 to around 3 KHz base bandwidth of an analog POTS interface, the filtering results in detrimental effects (primarily attenuation) on the higher frequency signals above 3 KHz that generally are used in DSL technologies. Unfortunately, the problem is not solved simply by getting the service provider to remove the load coils on each loop. While such an action certainly solves the technical limitations of load coils on DSL performance, economically it is an expensive process to remove the load coils. Furthermore, removal of the loading coils re introduces the voice-band degradations that the coils were introduced to overcome. As a result, the service provider often cannot justify the costs of basically custom re-engineering each of the multitude of subscriber lines to remove load coils in order to earn the additional revenues from offering DSL service.

Removing load coils generally would involve identifying the location of all of the load coils on a subscriber loop and sending a technician to each location to take the load coil out of the subscriber line circuit. Just sending the technician to each location would be costly enough. However, the physical process of removing load coils can create additional problems. For instance, most cables in the underground are pulp insulated such that wire pairs can be easily damaged as a result of a technician or cable splicer working on the splice to locate the wire pair affected by load coils. Obviously, damage to other pairs may knock out phone service to existing customers.

In addition, often the databases and records of service providers are incomplete and/or inaccurate in keeping up with the location of all the load coils that were installed on a particular subscriber loop over the years. Thus, in some cases various transmission line tests (such as, but not limited to tests performed by a time-domain reflectometer or TDR) might have to be performed to determine the distance along a subscriber loop transmission line at which there are changes in the characteristic impedance of the transmission line indicating potential items such as, but not limited to, load coils, junction splices, bridge taps, and/or connection points.

Because an impedance mismatch in a transmission line causes at least part of the energy from propagating electromagnetic signals to be reflected or echoed back in the opposite direction of the original propagation, a TDR and other types of test equipment generally can be used to send signals down a transmission line and measure the amount of time before a signal reflection or echo is received at the test equipment. This time measurement together with the estimated speed of propagation of the electromagnetic wave in the transmission line medium can be used to provide an estimate of the distance along the transmission line (such as a subscriber loop) where impedance mismatches occur. In general, telephone companies (or telcos) maintain computerized or paper plat records showing the location of telco facilities such as, but not limited to, wires, splice points, cross-connects, and DLCs used in delivering service to residential and commercial areas. The transmission line distances provided by a TDR or other test equipment for the potential location of impedance mismatches, which might be caused by load coils, would have to be used to estimate the approximate geographic location of a load coil based on the potentially inaccurate service provider records showing the wiring path for the transmission line from the central office or DLC to the customer premises. Obviously, such activities of identifying load coils and possibly having a technician physically track down the path followed by a subscriber loop transmission line can be costly. As a result of these load coil issues, either some customers are not offered DSL service at all or the price of the service is higher than it should be because of the increased costs of removing load coils. Thus, service providers are not able to offer DSL service to a relatively larger number of potential subscribers because of the load coil issue. Improving this load coil problem would increase the number of customers and associated revenues available to the service provider.

In addition, subscriber loops normally run through various other facilities in connecting a customer premises to a line card in a central office switch or in a digital multiplexer such as a DLC. Often telephone wiring is run in groups of large multi pair cables from a connection co-located with the line cards to a splice point, junction terminal, or cross-connect point. The cross-connect point generally is an unpowered box where technicians can cross-connect the wires leading to a customer premises with the appropriate wires leading back to the line cards in a switch or DLC. Often the portion of a local loop transmission line from a cross-connect box back to a line card is known as the F1 or feeder portion of a local loop, while the portion of a local loop transmission line from the cross-connect to the customer premises is known as the F2 or distribution portion of a local loop. Normally, the cross-connect box uses various mechanical technologies (such as but not limited to various punch-down block technologies) that are common in telephone wiring to simplify a technician's work in connecting the two portions of a subscriber loop. Unlike a digital loop carrier (DLC) cabinet, which generally is provided with power from the central office (and/or other sources) to enable the operation of the electronic devices of the line cards and multiplexing equipment, cross-connect boxes and/or cabinets generally are not provided with power other than the powering delivered over the POTS interface of each in-service POTS loop that provides for basic POTS functionality powering to a customer premises. This power on a POTS loop is designed for powering POTS analog phones with basic functionality (such as, but not limited to, dial tone) at the customer premises and generally does not provide a significant amount of excess power that could be siphoned off to power other types of electronic digital communications equipment. Often analog phones with POTS interfaces that offer more functionality such as a speaker phone or memory need additional power from an AC outlet or battery at the customer premises because the POTS interface does not provide enough power to meet the needs of these additional electronic functions.

In providing DSL service, often the network-side or CO-side of the DSL line is terminated in a DSLAM (Digital Subscriber Line Access Multiplexer) that usually is capable of supporting multiple DSL loops. One skilled in the art will be aware that a DSLAM normally comprises a plurality of DSL modems and some statistical multiplexing concentration equipment. However, such DSLAM equipment normally needs a reasonable amount of power and is usually placed in locations where power is readily available such as a central office (CO) or DLC cabinet. As cross-connect boxes generally do not have power available for powering active electronics, DSLAMs are not placed in cross-connect boxes. Furthermore, cross-connect boxes generally are not large enough to encompass significant amounts of additional electronic equipment in contrast to the relatively larger cabinets containing DLCs. Thus, normal deployment of DSLAMs for providing DSL service to customers does not place DSLAMs in cross-connect boxes at least because cross-connect boxes generally do not have a ready source of sufficient power and cross-connect boxes generally are not large enough for holding the DSLAM equipment.

Given these and other limitations of the wiring cable plant that was often originally installed many years ago to just provide basic POTS, new innovations that increase the availability and lower the total costs of delivering digital subscriber line (DSL) service provide benefits that can allow more consumers to obtain a reasonable digital service access line at an affordable price point.

SUMMARY OF THE INVENTION

The preferred embodiments of the present invention provide an apparatus and/or method for increasing the availability of DSL service by allowing service to be offered to more subscribers without having to expend the costs to remove all the limitations from subscriber line transmission lines. Briefly described, in architecture, one embodiment of the apparatus, among others, can be implemented as logic configured to perform a first DSL modulation on a first loop (or loop segment) and logic configured to perform a second DSL modulation on a second loop (or loop segment). In another embodiment, the apparatus may be viewed as supporting a plurality of loop segments and inverse multiplexing over those loop segments. In addition, yet another embodiment of the apparatus involves logic configured to change a direction of communication of a loop segment used in inverse multiplexing.

Briefly described, in architecture, one embodiment of the method, among others, can be implemented as transmitting according to a first DSL modulation on a first loop (or loop segment) and transmitting according to a second DSL modulation on a second loop (or loop segment). In another embodiment, the method may be viewed as supporting transmission on a plurality of loop segments and inverse multiplexing over those loop segments. In addition, yet another embodiment of the method changing a direction of communication of a loop segment used in inverse multiplexing.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
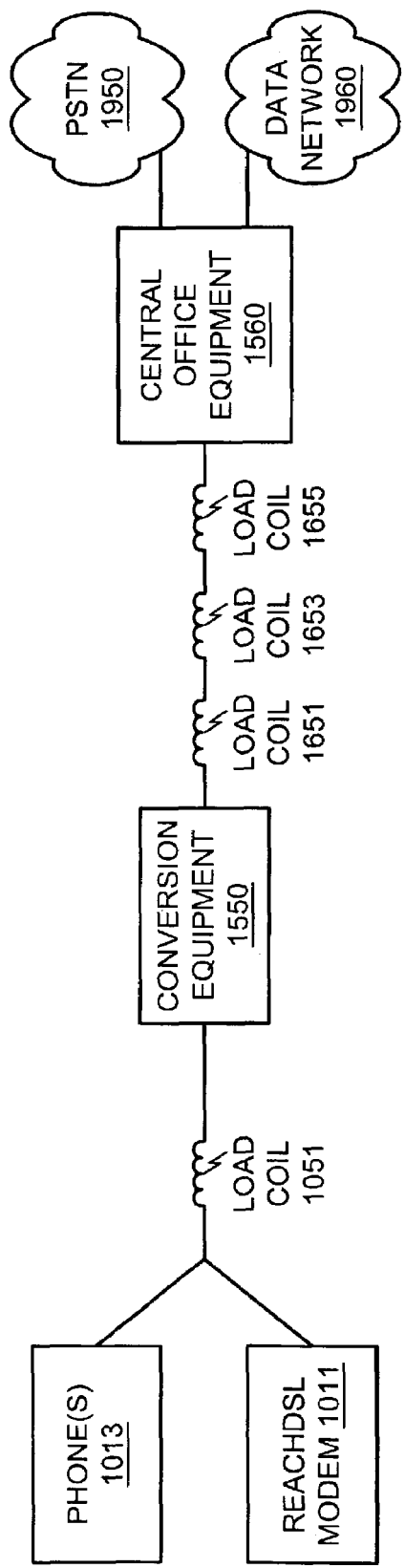
FIG. 1 is a block diagram of a single subscriber indirect DSL configuration over a loaded subscriber loop using Paradyne's ReachDSL technology.

Various types of modulation and/or duplexing techniques can be used to overcome the limitations of load coils. By their nature, the low pass, frequency-dependent filtering of load coils creates serious adverse effects on duplexing strategies that depend at least in part on frequency as well as on multiplexing strategies that depend on frequency separation to utilize a subscriber loop both for a basic native POTS interface in the 0-4 KHz POTS baseband together with the associated POTS signaling (such as but not limited to, POTS ringing, call waiting, calling line ID, and/or dual-tone multifrequency (DTMF) or pulse/rotary dialing) and for DSL service. One skilled in the art will be aware of the differences between a native POTS interface on a subscriber access line or loop and a derived or synthesized voice call functionality that may be provided through a local POTS interface off of customer premises equipment (CPE) that connects to one or more digital channels or digital media on a digital subscriber access line or loop. One non-limiting example of such a derived or synthesized voice call functionality is the circuit-switched speech capability available from an analog POTS port on an ISDN BRI terminal adapter (TA) that utilizes a 64 kbps ISDN B-channel to carry digital pulse code modulation (PCM) samples over the digital subscriber access loop or line back to the line card. Other more current synthesized or derived digital voice technologies often utilize compressed and/or packetized encoding of human voice instead of the 64 kbps or 56 kbps DS0s. Many but not all customers prefer DSL service to be offered on the same access line/loop (or lines/loops) that supports a basic native POTS interface in the 0-4 KHz baseband because many customers often view basic POTS service as a lifeline of the bare minimum quality of connectivity that is expected to be available in all but the most catastrophic emergency conditions such as an earthquake or hurricane. Thus, a solution that provides faster digital service over a loaded subscriber loop together with a capability to support an analog POTS interface is important.

In addition, with reference to all FIGS. 1-17, one skilled in the art will be aware that equipment labeled as central office (CO) equipment generally is CO-side, service provider-side, or network-side equipment, which may be located in other reasonable network-side concentration locations (such as but not limited to a DLC or a cross-connect box as will be described further) instead of just being limited to deployment in a CO. In addition, one skilled in the art will be aware that the terminology of CO-side, service provider-side, and network-side is commonly used to differentiate one portion of an interface's functionality from another portion of an interface's functionality that may be called in different contexts by terms such as, but not limited to, customer premises (CP)-side, user-side, or subscriber-side.

The patent application Ser. No. 10/434,219, entitled "Digital Subscriber Line Service Over Loaded Loops", and filed the same day is incorporated by reference in its entirety herein and describes some techniques for providing DSL service over loaded loops. The preferred embodiments of the present invention described herein extend the ability to offer DSL service over loaded loops and unloaded loops. One non-limiting solution to the problem of loaded loops is to add some conversion equipment to a subscriber loop to allow DSL to operate over the loaded loop.

FIG. 1 shows a potential configuration of adding conversion equipment to a loaded subscriber loop. In FIG. 1, a ReachDSL modem 1011 and one or more analog POTS phone(s) 1013 or other type of POTS CPE are connected to a portion of a subscriber loop with one load coil 1051 (or no load coils). The segment of the subscriber loop between conversion equipment 1550 and central office equipment 1560 (such as a line card in a switch or DLC) has at least one load coil arbitrarily shown as load coils 1651, 1653, and 1655. In effect, conversion equipment 1550 has been inserted in the subscriber loop between load coil 1051 and load coil 1651 to create two different segments of the subscriber loop. DSL service over the subscriber loop segment between conversion equipment 1550 and central office equipment 1560 could be provided in a non-limiting case using the techniques described in the patent application Ser. No. 10/434,219, entitled "Digital Subscriber Line Service Over Loaded Loops."

Furthermore, Paradyne's ReachDSL modem technology will work over unloaded subscriber loops (or unloaded segments) that include a single load coil with the loop segment length being up to approximately 15 Kft. Thus, using Paradyne's ReachDSL technology between ReachDSL modem 1011 and conversion equipment 1550 can provide DSL service over that portion or segment of the local loop. Therefore, the conversion equipment 1550 effectively segments or divides a subscriber loop to allow both POTS service to be provided between PSTN 1950 and analog phone(s) 1013 as well as DSL service to be provided between data network 1960 and ReachDSL modem 1011. One skilled in the art will be aware that throughout FIGS. 1-17, the PSTN generally has historically been a circuit-switched network, while data networks have tended to be packet-switched networks utilizing statistical multiplexing. However, one skilled in the art will be aware of many methods for interconnecting circuit-switched and packet-switched networks and of various industry trends have caused a convergence of various historically separate networking technologies. Thus, although the PSTN is commonly thought of as a circuit-switched network and the data network is thought of as a packet network, the preferred embodiments of the present invention are not to be limited to those common network architectures.

Figure 2:
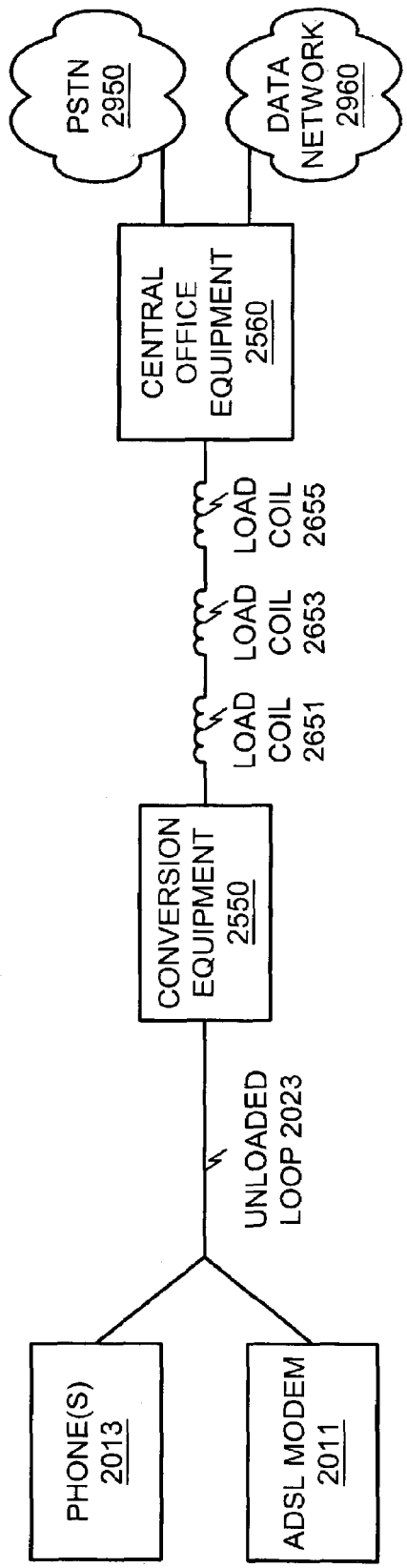
FIG. 2 is a block diagram of a single subscriber indirect DSL configuration over a loaded subscriber loop using standard ADSL technology that cannot work with any load coils.

Referring to FIG. 2, normal ADSL (Asymmetric Digital Subscriber Line) modems such as ADSL modem 2011 do not reliably work with any load coils on a subscriber loop. Thus, using standard ADSL technology, ADSL modem 2011 and analog POTS phone(s) 2013 are connected over an unloaded loop 2023 segment or portion to conversion equipment 2550. Conversion equipment 2550 then is further connected to central office equipment 2560 over a loaded loop segment comprising at least one load coil arbitrarily shown as load coils 2651, 2653, and 2655. In effect, conversion equipment 2550 has been inserted in the subscriber loop between load coil 1051 and load coil 2651 to create two different segments of the subscriber loop. DSL service over the subscriber loop segment between conversion equipment 2550 and central office equipment 2560 could be provided in a non-limiting case using the techniques described in the patent application Ser. No. 10/434,219, entitled "Digital Subscriber Line Service Over Loaded Loops." DSL service over the loop segment between conversion equipment 2550 and ADSL modem 2011 would use normal ADSL techniques. Using such a configuration, POTS service can be provided between phone(s) 2013 and PSTN 2950, and digital data service can be provided between ADSL modem 2011 and data network 2960 so long as the conversion equipment 2550 converts the digital signal between normal ADSL and other techniques that are capable of operating over loaded loops (or loop segments).

Figure 3:
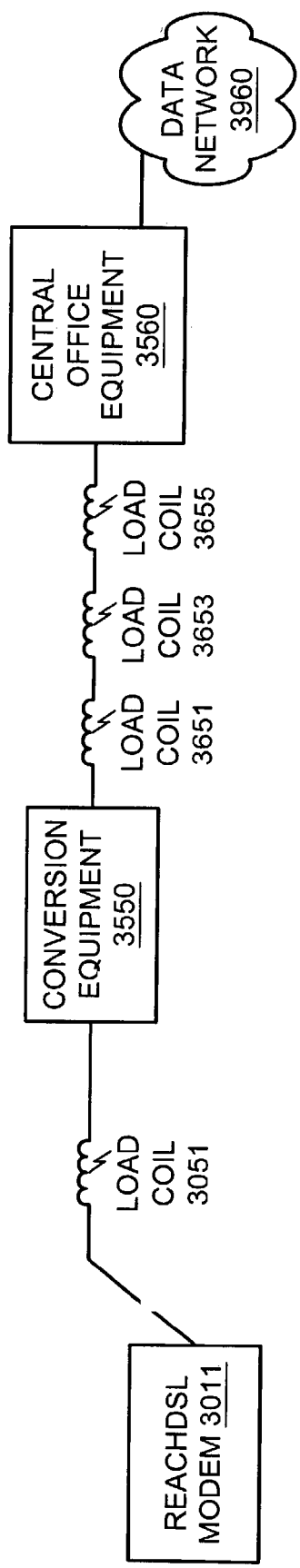
FIG. 3 is a block diagram of a single subscriber indirect DSL configuration over a loaded subscriber loop without supporting a native POTS interface on the subscriber loop.

FIG. 3 shows the special case where a customer is not also using the same subscriber line for basic analog POTS. In FIG. 3, ReachDSL modem 3011 is connected to a segment of a subscriber loop containing at most one load coil 3051 that further connects to conversion equipment 3550. Conversion equipment 3550 is connected to central office equipment 3560 over a segment of a subscriber loop having at least one load coil arbitrarily shown as load coils 3651, 3653, and 3655. As was the case in FIG. 1, the conversion equipment 3550 has in effect been inserted in the subscriber loop between load coil 3051 and load coil 3651 to create two different segments of the subscriber loop. DSL service over the subscriber loop segment between conversion equipment 3550 and central office equipment 3560 could be provided in a non-limiting case using the techniques described in the patent application Ser. No. 10/434,219, entitled "Digital Subscriber Line Service Over Loaded Loops." Because the customer does not use the subscriber line to carry a basic POTS interface in the 0-4 KHz baseband, the ReachDSL modem 3011 communicates with data network 3960, and no PSTN is shown. One skilled in the art will be aware of using various digitized and/or packetized voice technologies together with an appropriate gateway connecting the data network 3960 to the PSTN to provide a customer with PSTN access through the ReachDSL modem 3011.

Figure 4:
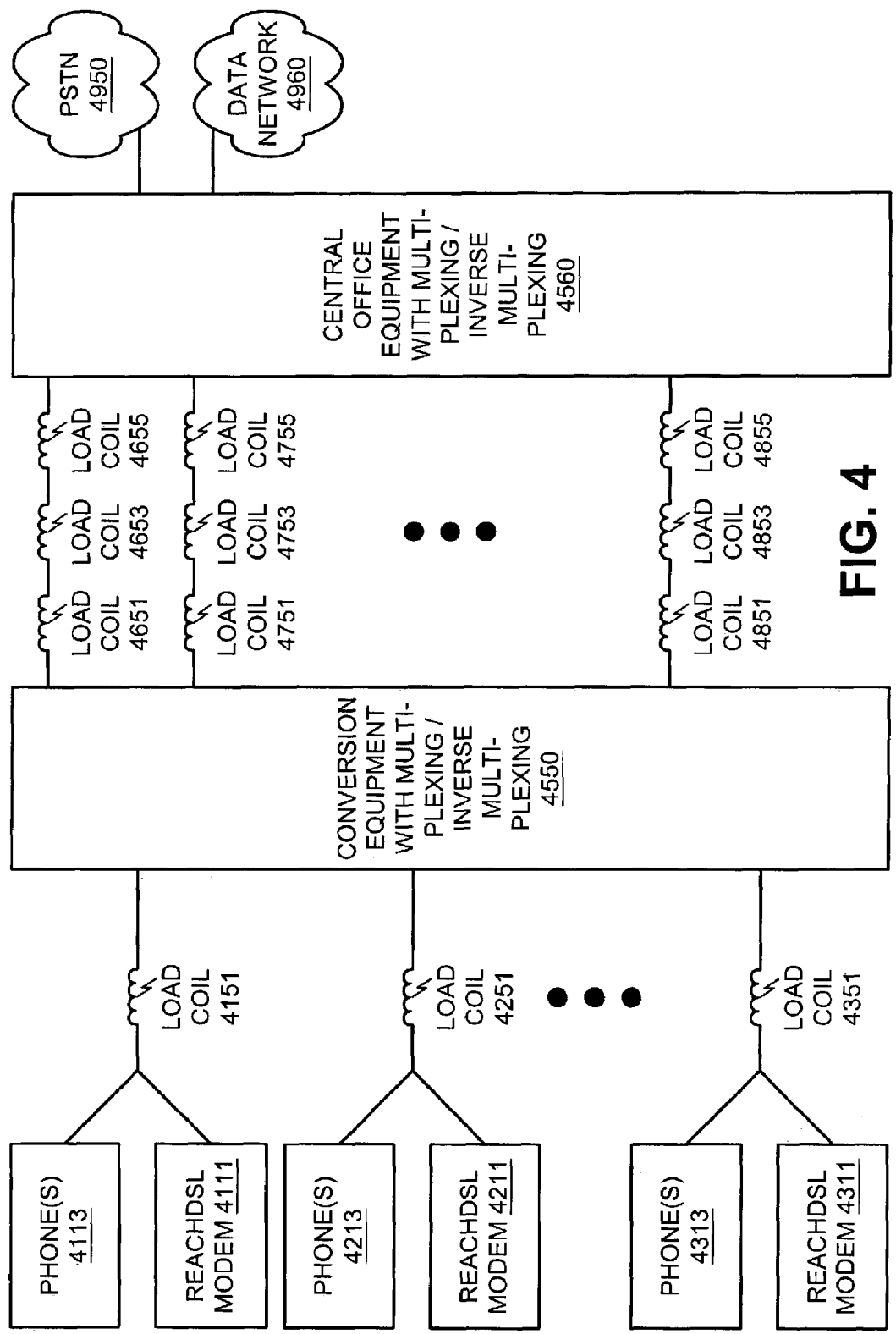
FIG. 4 is a block diagram of a multi-subscriber indirect DSL configuration over at least one loaded subscriber loop using Paradyne's ReachDSL technology.
Figure 5:
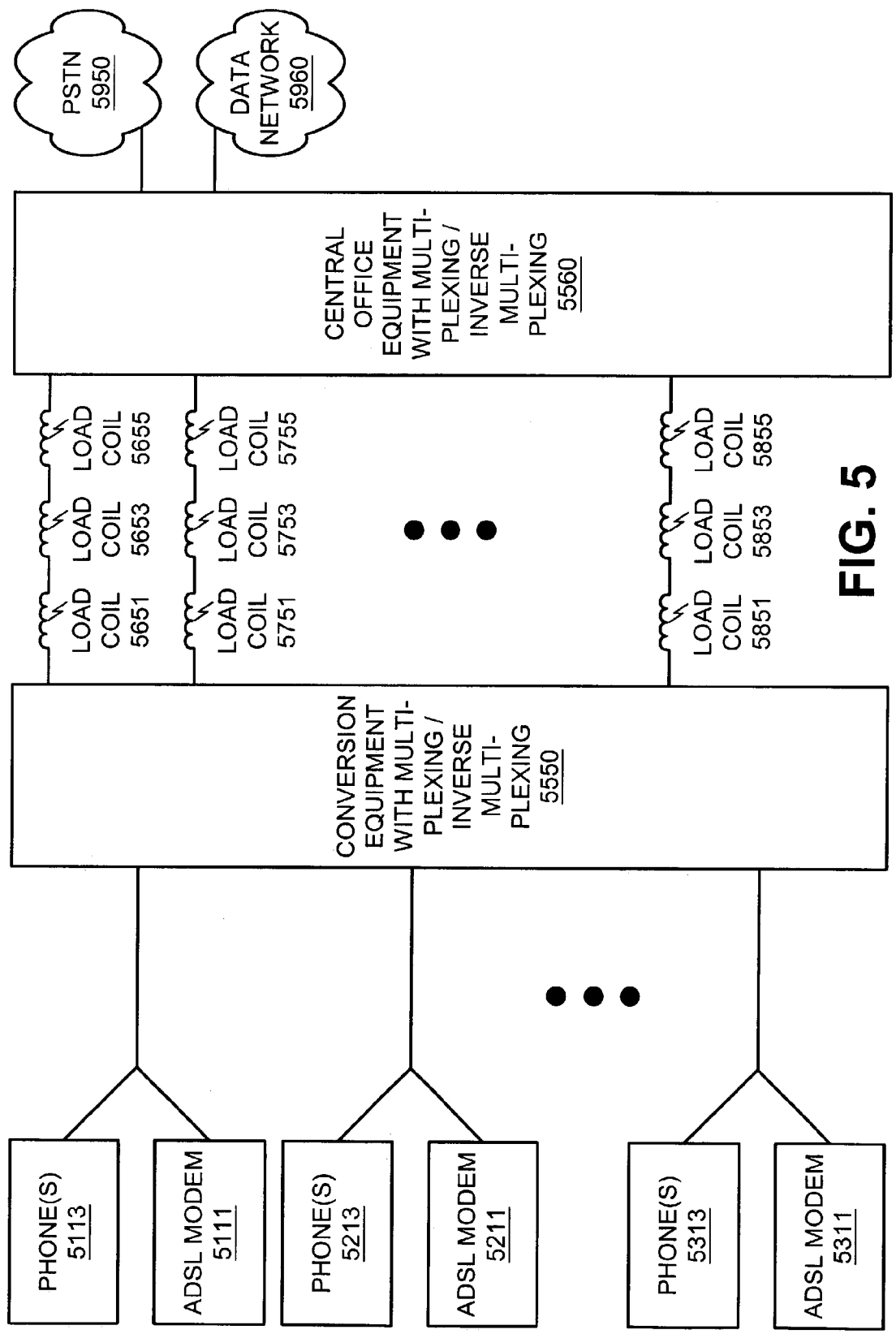
FIG. 5 is a block diagram of a multi-subscriber indirect DSL configuration over at least one loaded subscriber loop using standard ADSL technology that cannot work with any load coils.
Figure 6:
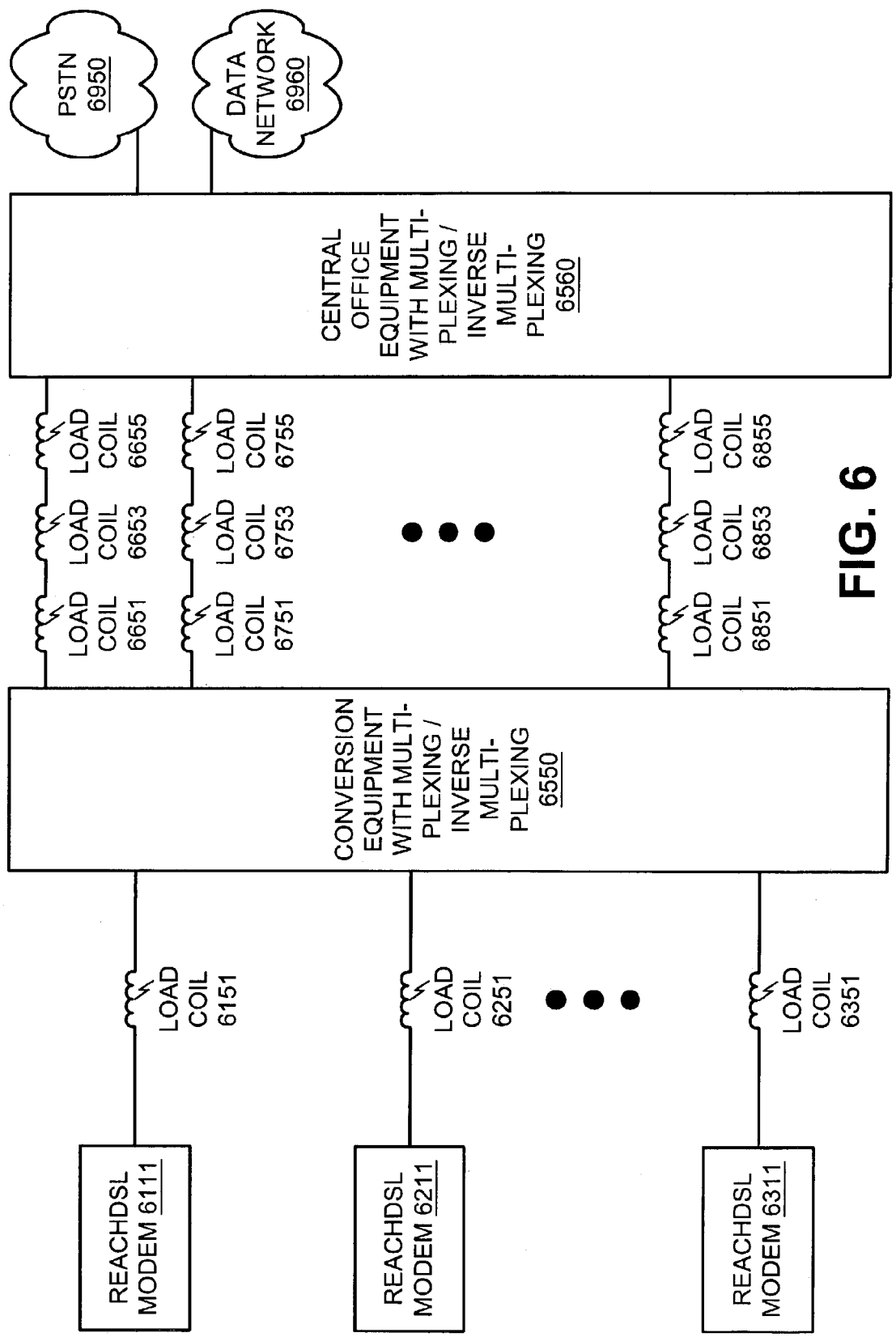
FIG. 6 is a block diagram of a multi-subscriber indirect DSL configuration over at least one loaded subscriber loop without supporting native POTS interfaces to the customer premises.

While the configurations of FIGS. 1-3 certainly will work to provide DSL service by inserting conversion equipment on each subscriber line that has a problem with load coils, those solutions are not necessarily the most efficient solutions when larger numbers of local loops in a common geographic customer service area have problems with load coils. Certainly, multiple instantiations of the single loop configurations of FIGS. 1, 2, and 3 could be used to support large numbers of DSL subscribers with loaded loops. However, such a configuration does not take advantage of concentrations when a relatively large number of DSL subscribers on loaded loops are located in close proximity to be served out of the same wiring concentration centers and facilities in the service provider's network. Thus, instead of just scaling up the single loaded subscriber loop configurations of FIGS. 1, 2, and 3, various multiplexing strategies can be used to gain some efficiencies when supporting a larger number of DSL customers. FIGS. 4, 5, and 6 show how multiplexing might be used in the case of supporting multiple customers (arbitrarily three customers in FIGS. 4, 5, and 6) for the loaded loop scenarios that correspond to individual customers in FIGS. 1, 2, and 3 respectively.

FIG. 4 shows: a first customer location with ReachDSL modem 4111 and analog POTS phone(s) 4113 connected to a segment of a first subscriber loop with at most one load coil 4151; a second customer location with ReachDSL modem 4211 and analog POTS phone(s) 4213 connected to a segment of a second subscriber loop with at most one load coil 4251; and a third customer location with ReachDSL modem 4311 and analog POTS phone(s) 4313 connected to a segment of a third subscriber loop with at most one load coil 4351. The three segments of the subscriber loops are further connected to conversion equipment with multiplexing/inverse multiplexing (mux/imux) 4550. In FIG. 4, ReachDSL technology is used over each of the subscriber loops with load coils 4151, 4251, and 4351 between conversion equipment with mux/imux 4550 and ReachDSL modems 4111, 4211, and 4311. As previously mentioned, Paradyne's ReachDSL technology is capable under certain conditions of working over local loops or segments of local loops containing one load coil. Furthermore, conversion equipment with mux/imux 4550 is connected to central office equipment with multiplexing/inverse multiplexing (mux/imux) 4560 over one or more segments of loaded loops. In the preferred embodiments of the present invention DSL service over the loop segments between conversion equipment 4550 and central office equipment 4560 would be provided using the techniques described in the patent application Ser. No. 10/434,219, entitled "Digital Subscriber Line Service Over Loaded Loops."

In FIG. 4, conversion equipment with mux/imux 4550 is connected to CO equipment with mux/imux 4560 over a first segment of a subscriber loop with at least one load coil (arbitrarily shown as load coils 4651, 4653, and 4655), over a second segment of a subscriber loop with at least one load coil (arbitrarily shown as load coils 4751, 4753, and 4755), and over a third segment of a subscriber loop with at least one load coil (arbitrarily shown as load coils 4851, 4853, and 4855). In addition, the central office equipment 4560 is further connected to PSTN 4950 and data network 4960, which in the non-limiting preferred embodiments of the present invention generally provide circuit-switching and packet-switching respectively.

The multiplexing and inverse multiplexing in conversion equipment with mux/imux 4550 and central office equipment with mux/imux 4560 means that the number of loaded loop segments between devices 4550 and 4560 do not have to match the number of loaded loop segments going from the conversion equipment 4550 to each customer location or customer premises. Instead, the segments of loaded loops between conversion equipment 4550 and central office equipment 4560 can be shared to support the plurality of subscribers. Such a configuration allows efficient usage of bandwidth over the loaded loop segments between conversion equipment 4550 and CO equipment 4560. Furthermore, such multiplexing and inverse multiplexing between conversion equipment 4550 and CO equipment 4560 on the wiring pairs, which previously may or may not have been used as segments of active subscriber loops before installation of the conversion equipment 4550, allows efficiency advantages based on the fact that most subscribers do not all try to access POTS and/or DSL service simultaneously. Thus, the multiplexing and inverse multiplexing can be designed with various contention ratios as subscribers contend for bandwidth access.

One skilled in the art will be aware that the PSTN and data networks generally also are designed using contention as a way to increase network efficiency based on statistical profiles of requests for service generally becoming more predictable as the number of users in a contention group increases (i.e., the variance generally decreases as the number of samples increases).

FIG. 5 shows: a first customer location with ADSL modem 5111 and analog POTS phone(s) 5113 connected to a segment of a first subscriber loop without any load coils; a second customer location with ADSL modem 5211 and analog POTS phone(s) 5213 connected to a segment of a second subscriber loop without any load coils; and a third customer location with ADSL modem 5311 and analog POTS phone(s) 5313 connected to a segment of a third subscriber loop without any load coils. The three segments of the subscriber loops are further connected to conversion equipment with multiplexing/inverse multiplexing (mux/imux) 5550. In FIG. 5, ADSL technology is used over each of the three subscriber loops (or loop segments) between conversion equipment with mux/imux 5550 and ADSL modems 5111, 5211, and 5311. As previously mentioned, unlike ReachDSL modems, standard ADSL modems are not capable of working over local loops or segments of local loops containing even one load coil. Furthermore, conversion equipment with mux/imux 5550 is connected to central office equipment with multiplexing/inverse multiplexing (mux/imux) 5560 over one or more segments of loaded loops. In the preferred embodiments of the present invention DSL service over the loop segments between conversion equipment 5550 and central office equipment 5560 would be provided using the techniques described in the patent application Ser. No. 10/434,219, entitled "Digital Subscriber Line Service Over Loaded Loops."

In FIG. 5, conversion equipment with mux/imux 5550 is connected to CO equipment with mux/imux 5560 over a first segment of a subscriber loop with at least one load coil (arbitrarily shown as load coils 5651, 5653, and 5655), over a second segment of a subscriber loop with at least one load coil (arbitrarily shown as load coils 5751, 5753, and 5755), and over a third segment of a subscriber loop with at least one load coil (arbitrarily shown as load coils 5851, 5853, and 5855). In addition, the central office equipment 5560 is further connected to PSTN 5950 and data network 5960, which in the non-limiting preferred embodiments of the present invention generally provide circuit-switching and packet-switching respectively.

The multiplexing and inverse multiplexing in conversion equipment with mux/imux 5550 and central office equipment with mux/imux 5560 means that the number of loaded loop segments between devices 5550 and 5560 do not have to match the number of loaded loop segments going from the conversion equipment 5550 to each customer location or customer premises. Instead the segments of loaded loops between conversion equipment 5550 and central office equipment 5560 can be shared to support the plurality of subscribers. Such a configuration allows efficient usage of bandwidth over the loaded loop segments between conversion equipment 5550 and CO equipment 5560. Furthermore, such multiplexing and inversion multiplexing between conversion equipment 5550 and CO equipment 5560 on the wiring pairs, which previously may or may not have been used as segments of active subscriber loops before installation of the conversion equipment 5550, allows efficiency advantages based on the fact that most subscribers do not all try to access POTS and/or DSL service simultaneously. Thus, the multiplexing and inverse multiplexing can be designed with various contention ratios as subscribers contend for bandwidth access.

One skilled in the art will be aware that the PSTN and data networks generally also are designed using contention as a way to increase network efficiency based on statistical profiles of requests for service generally becoming more predictable as the number of users in a contention group increases (i.e., the variance generally decreases as the number of samples increases).

FIG. 6 is similar to FIG. 4, but unlike FIG. 4 the three customer locations in FIG. 6 do not have analog POTS service. FIG. 6 shows: a first customer location with ReachDSL modem 6111 connected to a segment of a first subscriber loop with at most one load coil 6151; a second customer location with ReachDSL modem 6111 connected to a segment of a second subscriber loop with at most one load coil 6251; and a third customer location with ReachDSL modem 6311 connected to a segment of a third subscriber loop with at most one load coil 6351. The three segments of the subscriber loops are further connected to conversion equipment with multiplexing/inverse multiplexing (mux/imux) 6550. In FIG. 6, ReachDSL technology is used over each of the subscriber loops with load coils 6151, 6251, and 6351 between conversion equipment with mux/imux 6550 and ReachDSL modems 6111, 6211, and 6311. As previously mentioned, Paradyne's ReachDSL technology is capable under certain conditions of working over local loops or segments of local loops containing one load coil. Furthermore, conversion equipment with mux/imux 6550 is connected to central office equipment with multiplexing/inverse multiplexing (mux/imux) 6560 over one or more segments of loaded loops. In the preferred embodiments of the present invention DSL service over the loop segments between conversion equipment 6550 and central office equipment 6560 would be provided using the techniques described in the patent application Ser. No. 10/434,219, entitled "Digital Subscriber Line Service Over Loaded Loops."

In FIG. 6, conversion equipment with mux/imux 6550 is connected to CO equipment with mux/imux 6560 over a first segment of a subscriber loop with at least one load coil (arbitrarily shown as load coils 6651, 6653, and 6655), over a second segment of a subscriber loop with at least one load coil (arbitrarily shown as load coils 6751, 6753, and 6755), and over a third segment of a subscriber loop with at least one load coil (arbitrarily shown as load coils 6851, 6853, and 6855). In addition, the central office equipment 4560 is further connected to PSTN 6950 and data network 6960, which in the non-limiting preferred embodiments of the present invention generally provide circuit-switching and packet-switching respectively.

The multiplexing and inverse multiplexing in conversion equipment with mux/imux 6550 and central office equipment with mux/imux 6560 means that the number of loaded loop segments between devices 6550 and 6560 do not have to match the number of loaded loop segments going from the conversion equipment 6550 to each customer location or customer premises. Instead the segments of loaded loops between conversion equipment 6550 and central office equipment 6560 can be shared to support the plurality of subscribers. Such a configuration allows efficient usage of bandwidth over the loaded loop segments between conversion equipment 6550 and CO equipment 6560. Furthermore, such multiplexing and inversion multiplexing between conversion equipment 6550 and CO equipment 6560 on the wiring pairs, which previously may or may not have been used as segments of active subscriber loops before installation of the conversion equipment 6550, allows efficiency advantages based on the fact that most subscribers do not all try to access POTS and/or DSL service simultaneously. Thus, the multiplexing and inverse multiplexing can be designed with various contention ratios as subscribers contend for bandwidth access. One skilled in the art will be aware that the PSTN and data networks generally also are designed using contention as a way to increase network efficiency based on statistical profiles of requests for service generally becoming more predictable as the number of users in a contention group increases (i.e., the variance generally decreases as the number of samples increases).

Although FIGS. 4, 5, and 6 show all customer premises to be configured exactly the same, one skilled in the art will be aware that equipment can be built supporting multiple configurations. Thus, a single piece of conversion equipment with mux/imux may support different customer configurations such as but not limited to, ReachDSL plus POTS on a loop (or loop segment) with one load coil, ReachDSL plus POTS on a loop with no load coils, ADSL plus POTS on a loop with no load coils, ADSL without POTS on a loop with no load coils, ReachDSL without POTS on a loop with one load coil, and ReachDSL without POTS on a loop with no load coils.

Furthermore, one skilled in the art will be aware of various multiplexing techniques that usually are performed to separate and combine various information flows to share common facilities or resources for propagation of the electromagnetic signals while still allowing a receiver to pick out the proper signal. As information flows generally are carried in electromagnetic waves due to the propagation speed of the waves, the different characteristics of electromagnetic waves can be used to develop various multiplexing techniques. For example, some common parameters of electromagnetic waves are time, frequency, space, direction of propagation, and polarity that each can be used to separate electromagnetic signals sharing some common resource. Some non-limiting examples of the ways these different characteristics of electromagnetic waves lead to multiplexing techniques include, but are not limited to, time-division multiplexing (TDM) for sharing a common communications medium, frequency division multiplexing (FDM) for sharing a common communications medium, and spatial or distance separation of electromagnetic signals to prevent interference. Furthermore, given that the wavelength and the frequency of an electromagnetic wave are related to the speed of light, wavelength-division multiplexing (WDM) is a form of FDM. In addition, coding theory provides another way for separating information that is used in code-division multiple access (CDMA) technologies. In addition, the two common types of TDM are fixed or static TDM, with the 56/64 kbps DS0 channels in the PSTN being a common example, and statistical or dynamic TDM, with packet networks being a common example.

While various multiplexing techniques could be used over loaded loops (or loaded loop segments) between conversion equipment 4550 and CO equipment 4560 in FIG. 4, between conversion equipment 5550 and CO equipment 5560 in FIG. 5, and between conversion equipment 6550 and CO equipment 6560 in FIG. 6, some multiplexing techniques are more cost efficient than others given various amounts of information that needs to be communicated between two points and the bandwidth resources available to provide for the communication. Often changes in the costs of the electronic devices used to implement various types of multiplexing can change the most cost efficient type of multiplexing to use in a product. However, time-division multiplexing certainly is one multiplexing technique that has been commonly used in low cost devices because the digital devices for TDM generally have followed Gordon Moore's law of increasing in performance and decreasing in price. Although some of the older analog trunk equipment in the phone network used FDM and some point-to-point microwave toll hops used FDM, the PSTN generally moved towards TDM with the introduction of digital technologies such as T-carrier (and later technologies such as SONET). If not for the problems of powering an ISDN terminal adapter (TA) in emergency situations, TDM would have been used for more DSL deployments to customer premises. ADSL was designed to be frequency-division multiplexed above the POTS baseband because of the lifeline emergency requirements for the 0-4 KHz powered POTS interface.

Generally, service providers are required to use equipment that meets certain reliability standards such as NEBS (Network Equipment/Building System) compliance in various locations in their networks. Thus, service providers are familiar with designing their networks and network powering to meet various reliability requirements. Unlike requiring customers to design their own powering reliability that was one of the pitfalls of using BRI ISDN for POTS replacement, service providers are in the business of providing reliable power to their network equipment. Because service providers can design their network to deliver high enough reliability power to equipment located at a wiring concentration center where the conversion equipment 4550, 5550, or 6550 may be located, the multiplexing across the loops or loop segments between the conversion equipment 4550, 5550, or 6550 and the CO equipment 4560, 5560, or 6560 no longer would necessarily have to carry a native 0-4 KHz POTS interface that is frequency-division multiplexed on each loop. Instead, one skilled in the art will be aware that the POTS service can be digitized to be carried in a fixed TDM manner of 56 kbps or 64 kbps A-law or μ-law speech and associated digital signaling messages. Also, one skilled in the art will be aware that various fixed and variable format improved voice compression techniques have been developed since 56/64 kbps A-law or μ-law speech was developed for T1/E1. Also, one skilled in the art will be aware that various packetized voice techniques have been developed for communicating voice and voice-call signaling over the statistical time-division multiplexing of packet networks.

While the efficiency improvements from multiplexing and aggregation are known to one of ordinary skill in the art, other factors also are important in communications systems. For example, aggregating a large amount of traffic through various concentration techniques such as multiplexing generally can improve efficiency, but may alternatively hurt network reliability as the concentrated locations become single points of failure affecting the communications traffic of a larger number of users. Thus, in addition to efficiency, redundancy is another important criteria in network design.

While concentrating the data and voice traffic of many customers into a single multiplexed digital stream offers efficiency improvements, it may create some more concentrated potential points of failure. Because basic native 0-4 KHz POTS service is generally considered a lifeline service demanding high reliability, there may be some justifications for not digitizing and multiplexing all the native 0-4 KHz POTS communication from subscribers. The embodiments of the present invention also will work if the native POTS communication is not digitized, but is instead carried back to a corresponding POTS line card in a CO or DLC for each of the subscriber loops with both native POTS and DSL service that are connected to the conversion equipment 5550, 6550, or 7550. Generally, the DSL data service provided from the conversion equipment 5550, 6550, or 7550 has lower reliability requirements than lifeline POTS service. Thus, the DSL data traffic from multiple customers generally would be multiplexed together and inverse multiplexed over multiple loops, even though a native 0-4 KHz POTS service for a customer might not be multiplexed in with this DSL data.

One skilled in the art will be aware that there often are various trade-offs with different multiplexing strategies that affect criteria such as, but not limited to, efficiency, reliability, and/or security. Generally, the DSL data service and the native 0-4 KHz POTS service have different reliability criteria for most customer situations. However, the reliability criteria certainly can vary from customer to customer. Thus, embodiments of the present invention certainly could be configured to allow different customer-by-customer policy decisions for the multiplexing techniques (or lack thereof) to handle a particular customer's voice and/or data communication, while meeting the various performance criteria demanded by the customer.

As a non-limiting example, a customer premises such as a fire house, police precinct, or other emergency service location may need even higher reliability native 0-4 KHz POTS service than a normal residential customer premises. As a non-limiting example, the preferred embodiments of the present invention can be configured to utilize various multiplexing techniques to carry the DSL data and native 0-4 KHz POTS "lifeline" interfaces of various residential customers when sufficiently-capable powering reliability to the conversion equipment exists to meet the reliability requirements of using a digitized POTS service to carry the residential customer's POTS lifeline connectivity. However, the preferred embodiments of the present invention may provide DSL data service to a firehouse on the same loop providing a native 0-4 KHz POTS interface to the firehouse, with the firehouse requiring its POTS service to meet even higher reliability requirements than normal residential POTS. To the extent that these higher reliability requirements of the firehouse are not met by the powering reliability and redundancy network design choices for supplying the conversion equipment 5550, 6550, or 7550 with power, the native 0-4 KHz POTS interface for just the firehouse customer premises may be carried back to a line card in a CO or DLC without being digitized and/or multiplexed by the conversion equipment 5550, 6550, or 7550. thus, the POTS service to the firehouse customer may be wired different than the POTS service to other POTS residential customers though the same conversion equipment 5550, 6550, or 7550 may provide loaded loop DSL service to both.

Thus, the embodiments of the present invention also will work if only some or none of the native POTS communication is digitized. Instead, for any particular chosen customer loop with native POTS service, the POTS service could be continued to be carried back from conversion equipment 5550, 6550, or 7550 to a POTS line card in a CO or DLC on its local loop that just carries POTS service without utilizing any multiplexing efficiencies of concentration. While such a configuration may be inefficient in bandwidth usage, it may offer additional reliability and redundancy advantages that are important for some lifeline POTS situations.

Figure 7:
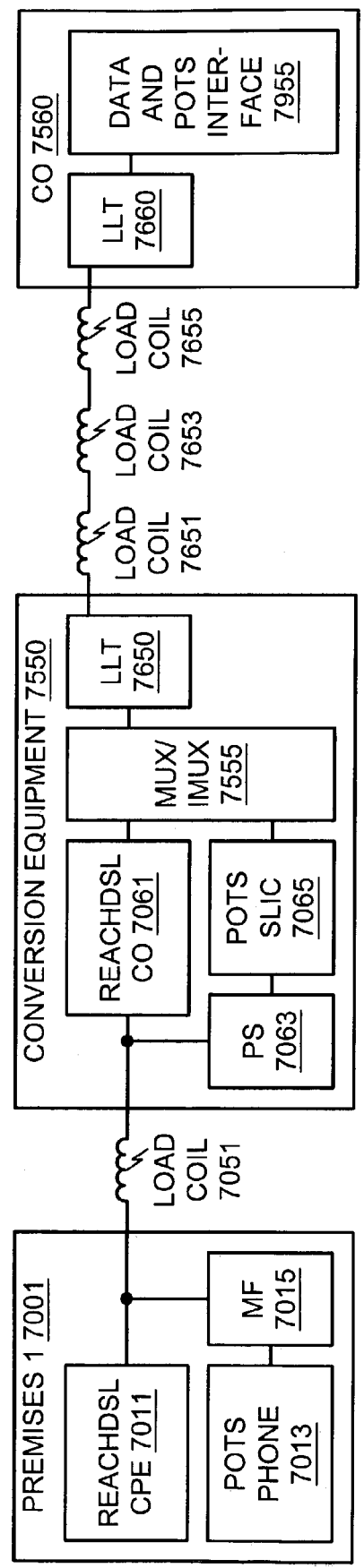
FIG. 7 is a more detailed block diagram showing an embodiment of conversion equipment for a s ingle subscriber indirect DSL configuration over a loaded subscriber loop using Paradyne's ReachDSL technology.

FIG. 7 shows more detail of conversion equipment to support a single subscriber loop. In FIG. 7, a customer premises 7001 comprises a ReachDSL CPE-side modem 7011, a POTS phone 7013 (which may be other types of equipment with a customer-side POTS interface), and a microfilter (MF) 7015. One skilled in the art will be familiar with DSL microfilters. The customer premises 7001 is connected to conversion equipment 7550 over a subscriber loop (or a segment of a subscriber loop), which may have up to one load coil 7051 over which ReachDSL will operate. Conversion equipment 7550 further comprises ReachDSL CO-side modem 7061 and a POTS splitter (PS) 7063, whose function will be known to one of ordinary skill in the art of DSL technology. Furthermore, the POTS splitter 7063 is connected to a POTS subscriber line interface card (SLIC) 7065 that generally would implement the functions of a CO-side standard POTS interface in the same way that a line card in a CO switch or DLC provide such a POTS interface. The ReachDSL CO modem 7061 and POTS SLIC 7065 generally would present a digital interface to multiplexer 7555. The digital interface of POTS SLIC 7065 could be the standard 56/64 kbps DS0 PCM (Pulse Code Modulation) voice, some other fixed bandwidth compressed voice format such as but not limited to 32 kbps ADPCM (Adaptive Differential Pulse Code Modulation), some variable bandwidth compressed voice format such as but not limited to CELP (Code Excited Linear Prediction) voice, or some packetized digital voice format.

The digital information from ReachDSL CO modem 7061 and POTS SLIC 7065 is multiplexed together in multiplexer/inverse multiplexer (mux/imux) 7555 before being passed on to loaded loop transceiver 7650. The conversion equipment 7550 is connected to CO-side equipment 7560 over one or more subscriber loops (or subscriber loop segments). Active subscriber loops between the conversion equipment 7550 and CO-side equipment 7560 have a conversion-equipment-side loaded loop transceiver (LLT) 7650 in communication with a CO-side loaded loop transceiver (LLT) 7660. The CO-side loaded loop transceiver (LLT) 7660 is connected to data and POTS interface 7955 that in the preferred embodiment might separate out the data from the ReachDSL modem for connection to a data network, while separating out the customers POTS information for connection to the PSTN. Potentially, the POTS information might not be converted back to individual analog POTS loops but could be provided to a central office switch in a GR-303 digital format that is commonly used for interfacing CO switches to digital loop carrier (DLC) systems, which use 56/64 kbps PCM voice and TDM for digitally carrying the information from many POTS subscriber lines to a CO switch in the PSTN. Alternatively, many telephone companies already have standard packetized voice interfaces to the PSTN. One such interface is the broadband loop emulation service (BLES) that generally is based on VoDSL using ATM Adaptation Layer 2 (AAL2). The packetized voice of the BLES interface might use 32 kbps ADPCM voice encoding.

In general, to support a native 0-4 KHz POTS interface on the loop going to the subscriber premises, the choice of a particular type of voice encoding and whether statistical TDM (i.e., packets) or fixed TDM is used to carry digitized voice over the loaded loops is independent from the choices used in interfacing voice to the PSTN. One voice format generally can be converted to another voice format. However, such format conversions generally require substantial processing power, which may be a reasonable tradeoff in exchange for a more efficient voice encoding and multiplexing scheme that reduces bandwidth demands on the loaded loops between the conversion equipment 7550 and CO-side equipment 7560. A 11 possible types of digitized voice encodings and/or multiplexing schemes for carrying voice the conversion equipment 7550 and CO-side equipment 7560 to support native POTS service in the 0-4 KHz bandwidth are intended to be within the scope of the present invention. Also, all possible formats for interfacing voice to the PSTN are intended to be within the scope of the present invention.

Figure 8:
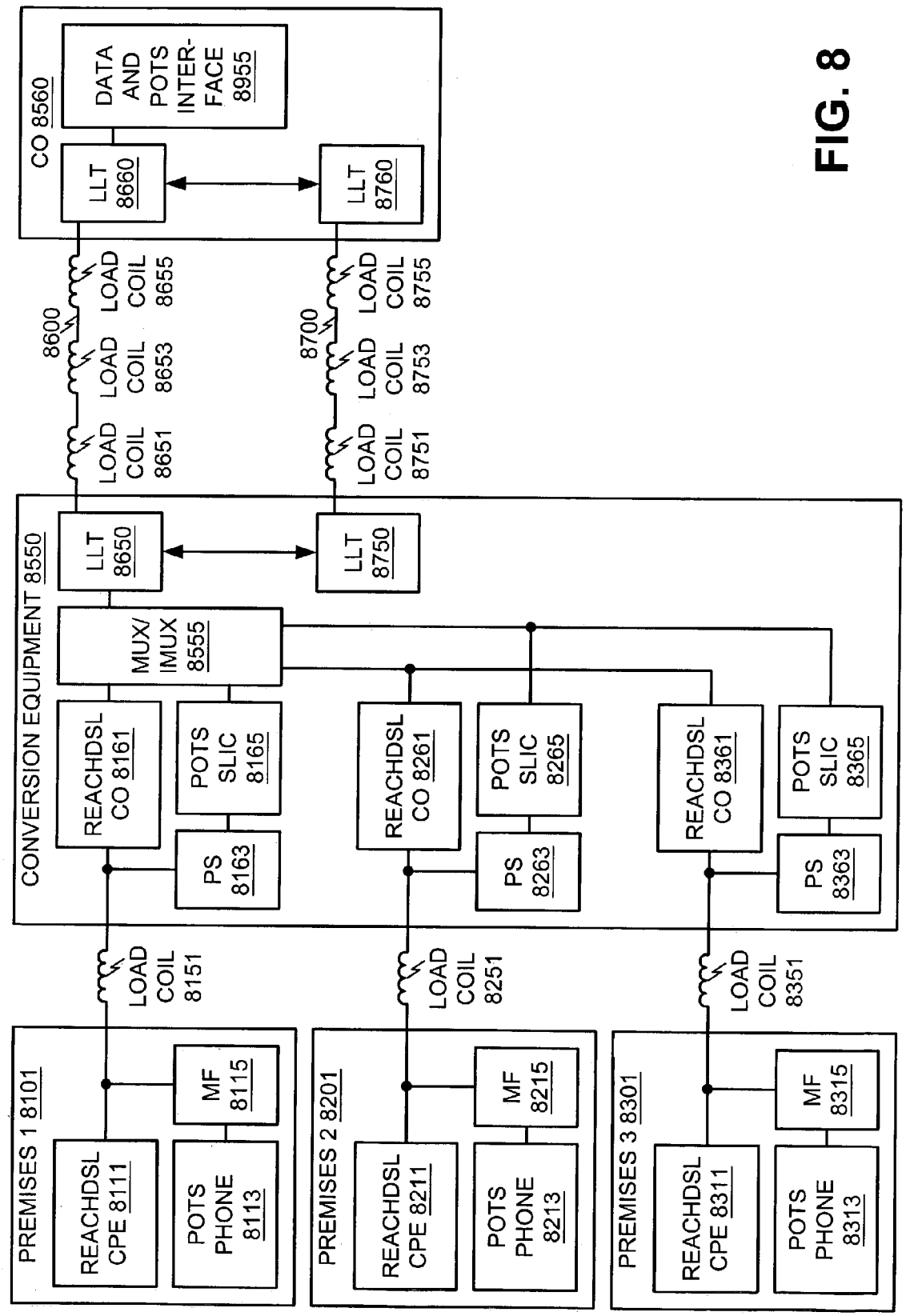
FIG. 8 is a more detailed block diagram showing an embodiment of conversion equipment for a multi-subscriber indirect DSL configuration over a loaded subscriber loop using Paradyne's ReachDSL technology.

FIG. 8 shows the connections for a multiple subscriber/multiple customer premises implementation of the configuration of FIG. 7. Generally, each component acts similarly to the way it acted in FIG. 7. The first customer premises 8101 contains ReachDSL CPE modem 8111, POTS phone 8113, and microfilter (MF) 8115 and is connected over a subscriber loop with up to one load coil 8151 to conversion equipment 8550. Conversion equipment contains ReachDSL CO modem 8161, POTS splitter (PS) 8163, and POTS subscriber line interface card (SLIC) 8165 to support the data and POTS of the first customer premises 8101. The second customer premises 8201 contains ReachDSL CPE modem 8211, POTS phone 8213, and microfilter (MF) 8215 and is connected over a subscriber loop with up to one load coil 8251 to conversion equipment 8550. Conversion equipment contains ReachDSL CO modem 8261, POTS splitter (PS) 8263, and POTS subscriber line interface card (SLIC) 8265 to support the data and POTS of the second customer premises 8201. The third customer premises 8301 contains ReachDSL CPE modem 8311, POTS phone 8313, and microfilter (MF) 8315 and is connected over a subscriber loop with up to one load coil 8351 to conversion equipment 8550. Conversion equipment contains ReachDSL CO modem 8361, POTS splitter (PS) 8363, and POTS subscriber line interface card (SLIC) 8365 to support the data and POTS of the third customer premises 8301. The digital information flows for supporting POTS and data at each of the three customer premises 8101, 8201, and 8301 are multiplexed together and inverse multiplexed across at least one and probably a plurality of loops between conversion equipment 8550 and CO-side equipment 8560. Each of the loops has a conversion equipment-side loaded loop transceiver (LLT) and a CO-side loaded loop transceiver (LLT). For the first loop 8600 between conversion equipment 8550 and CO-side equipment 8560, LLT 8650 is connected over a loaded loop 8600 with at least one load coil (arbitrarily shown as load coils 8651, 8653, and 8655) to LLT 8660. For the second loop 8700 between conversion equipment 8550 and CO-side equipment 8560, LLT 8750 is connected over a loaded loop 8700 with at least one load coil (arbitrarily shown as load coils 8751, 8753, and 8755) to LLT 8760. On the CO-side, the information flows are properly multiplexed, demultiplexed, and/or inverse multiplexed before being passed to the proper networks through data and POTS interface 8955. As described previously with respect to FIG. 7, although individual POTS loops could be used for data and POTS interface 8955, the higher concentrations of POTS interfaces at this point make it preferred to use some form of multiplexed POTS interface to the PSTN such as, but not limited to, the GR-303 interface that is used for DLCs. Alternatively, many telephone companies already have standard packetized voice interfaces to the PSTN. One such interface is the broadband loop emulation service (BLES) that generally is based on VoDSL using ATM Adaptation Layer 2 (AAL2). The packetized voice of the BLES interface might use 32 kbps ADPCM voice encoding.

In general, to support a native 0-4 KHz POTS interface on the loop going to the subscriber premises, the choice of a particular type of voice encoding and whether statistical TDM (i.e., packets) or fixed TDM is used to carry digitized voice over the loaded loops is independent from the choices used in interfacing voice to the PSTN. One voice format generally can be converted to another voice format. However, such format conversions generally require processing horsepower, which may be a reasonable tradeoff in exchange for a more efficient voice encoding and multiplexing scheme that reduces bandwidth demands on the loaded loops between the conversion equipment 8550 and CO-side equipment 8560. All possible types of digitized voice encodings and/or multiplexing schemes for carrying voice the conversion equipment 8550 and CO-side equipment 8560 to support native POTS service in the 0-4 KHz bandwidth are intended to be within the scope of the present invention. Also, all possible formats for interfacing voice to the PSTN are intended to be within the scope of the present invention.

As can be seen from FIG. 8, the multiplexing/inverse multiplexing leads to the number (3) of loops (or loop segments) between the conversion equipment 8550 and the three customer premises 8101, 8201, and 8301 being potentially different from the number (2) of loops (or loop segments) between LLTs 8650/8670 and LLTs 8750/8760. Various criteria, such as but not limited to, the amount of bandwidth available on a loaded loop between conversion equipment 8550 and CO-side equipment 8560, the expected and/or peak data bandwidth utilization by expected customers, the techniques used for encoding and/or compressing voice, the allowable contention ratios for customers, as well as many other factors would go into the capacity planning to properly size a configuration with a reasonable number of loaded loops between conversion equipment 8550 and CO-side equipment 8560 to meet various quality of service (QoS) goals in a contract between a service provider and a customer.

In addition, various types of techniques can be used for carrying the bi-directional communications between conversion equipment 8550 and CO-side equipment 8560. To the extent that the loaded loops between conversion equipment 8550 and CO-side equipment no longer carry a native analog POTS interface in the 0-4 KHz frequency band, this bandwidth is freed up for digital communication. Also, the potentially large number of loops between conversion equipment 8550 and CO-side equipment 8560 allows for some additional duplexing strategies that were not as practical for DSL delivery to a customer premises that generally is initially wired with only two loops under the standard operating line installation procedures of telcos. With a large number of loaded loops between conversion equipment 8550 and 8560, four-wire duplexing is one duplexing strategy that removes all the frequency-dependent problems of frequency-division duplexing (FDD) and the frequency-dependent effects to the echo cancellation noise floor in pure echo cancelled duplex (ECD). As was discussed in more detail in the patent application Ser. No. 10/434,219, entitled "Digital Subscriber Line Service Over Loaded Loops", and filed the same day that was previously incorporated by reference in its entirety herein, load coils on telco loops introduce frequency-dependent problems. However, four-wire duplexing and time-division duplexing (TDD) and/or adaptive time-division duplexing (ATDD) generally are not affected by frequency-dependent impediments such as load coils.

One skilled in the art will be aware that various types of communication applications have different directional traffic patterns. For instance, telephone conversations generally are symmetric, while internet access where a user downloads many web pages generally is asymmetric. Asymmetric Digital Subscriber Line (ADSL) was designed given these traffic patterns that normally occur as subscribers use DSL lines for internet access. Using four-wire duplexing techniques on more than two loops allows a service provider to allocate asymmetric amounts of bandwidth for each direction of communication over the loaded loops. In general, when only four wires (or two pair) are available, four-wire duplexing uses one wire pair for one direction of communication and the other pair form the opposite direction of communication. Basically, each pair is used in a simplex fashion to just support a single direction of communication. Similarly, multiple loops between conversion equipment 8550 and CO-side equipment 8560 could be configured in a simplex fashion to support each direction of communication. As a non-limiting example, suppose there are ten loaded loops (with all the same bit rate capacities) between conversion equipment 8550 and CO-side equipment 8560. Further suppose that data traffic patterns whether determined statically or dynamically based on data demand have an asymmetric ratio suggesting 70% of the traffic is downstream from the network to the user, while 30% of the traffic is upstream from the user to the network. In such a non-limiting example, seven of the loops between conversion equipment 8550 and CO-side equipment 8560 could be used to support simplex downstream communication, while three of the loops between conversion equipment 8550 and CO-side equipment 8560 could be used to support simplex upstream communication. Obviously an equal number of loops could be used in simplex for each direction of traffic if the traffic patterns are more symmetric. Also, TDD/ATDD might be used to subdivide the direction of communication for one or a few loops not using simplex communications to generally match any particular requirement ratios of upstream to downstream bandwidth.

In addition to a fixed asymmetrical allocation of some wire pairs to one direction of communication and some wire pairs to another direction of communication, the asymmetry/symmetry of the use of various pairs of wires of loaded loops can be varied dynamically and statistically based on changing data demands for each direction of communication. For example, with four loaded loops between conversion equipment 8550 and CO-side equipment 8560 that each only are used in a simplex fashion, bi-directional communications can be continuously allowed while the asymmetry/symmetry varies from three pairs in one direction and one pair in the other direction to two pairs in one direction and two pairs in the other direction before varying again to one pair in one direction and three pairs in the other direction. Thus, these assignments of a wire pair or loop to carry a particular direction of traffic can be static or dynamic, and the dynamic allocations may be automatic and/or adaptive to network conditions such as, but not limited to, the demands for bandwidth in a particular direction balanced against the demands for bandwidth in the opposite direction.

Furthermore, other potential solutions to bi-directional communication are possible. Certainly, multiple wire pairs can each provide duplex communications using various techniques such as, but not limited to, TDD/ATDD, pure ECD, and Extended Performance ECD that is described in U.S. patent application Ser. No. 10/420,204, which is entitled "Extended-Performance Echo-Cancelled Duplex (EP ECD) Communication", was filed on Apr. 22, 2003, and is incorporated by reference in its entirety herein. Also, asymmetrical rate echo cancellation can also be used in the duplexing.

With regard to the inverse multiplexing of various digital bit streams of both data (potentially including synthesized or derived voice from technologies such as but not limited to VoDSL, VoIP, and VoATM provided in the DSL channel on a subscriber loop) and voice (from the native POTS channel on a subscriber line), various techniques for inverse multiplexing information flows over multiple links are known in the art. Some non-limiting examples include the multi-link point-to-point protocol (MLPPP), the ethernet link aggregation protocol, and the open shortest path first (OSPF) routing protocol. However, these techniques are not necessarily well suited to the preferred embodiments of the present invention. In general, the listed example techniques all are designed for large data frames and often introduce latency that is detrimental to real time applications such as carrying POTS voice. Certainly one or more loaded loops between conversion equipment 8550 and CO-side equipment 8560 could utilized fixed TDM time slots to carry the POTS voice with the time slots being filled in a round robin fashion in the same way T1 carries digitized POTS phone calls. However, such a solution might not be the most efficient.

Instead various statistical time-division multiplexing (STDM) techniques offer the advantage of using any and potentially all of the loaded loops to carry either data from/to DSL modems as well as the digitized voice from/to analog POTS phones. A small packet size in the statistical multiplexing can be used to help reduce latency. Thus, ATM would seem to be a preferable method for handling the multiplexing/inverse multiplexing over the loaded loops between conversion equipment 8550 and CO-side equipment 8560. ATM offers the bandwidth utilization efficiencies of statistical multiplexing, while addressing the latency issues with a small cell size of 53 octets including 48 octets of data and a 5 octet header. In addition, ATM has some well-developed quality of service (QoS) mechanisms that can be used to meet the differing performance requirements of both real-time voice and computer data. In exchange for its advantages, ATM introduces the minor penalty of a larger amount of the bandwidth being used for communicating header information than would be used in larger size packets in frame relay or IP.

The inverse multiplexing for MLPPP, ethernet link aggregation, and ATM in Inverse Multiplexing over ATM (IMA) generally are OSI (Open Systems Interconnect) layer two constructs, while the inverse multiplexing of IP datagrams across multiple OSPF links generally is an OSI layer three construct. One skilled in the art will be aware that inverse multiplexing can also be performed at the OSI level one physical layer. The bandwidth on demand interoperability group (BONDING) developed a physical layer inverse multiplexing standard for 56/64 kbps DSOs that was primarily used for digital video. Various physical layer inverse multiplexing techniques also could be utilized in the preferred embodiments of the present invention to interleave bits at the physical medium dependent (PMD) sublayer.

Also, when dealing with inverse multiplexing of multiple links, the propagation delay time over each link can sometimes vary. For example, on a 128 kbps circuit-switched video call over two ISDN B-channels, each DSO phone call could follow different paths through the PSTN such that one DSO is routed over a land line and the other DSO is routed over a satellite channel. The resulting potentially large delay differences generally should be addressed by the inverse multiplexing technology. However, in the preferred embodiments of the present invention, the lengths of the loops between conversion equipment 8550 and CO-side equipment 8560 will be approximately the same. As a result, electromagnetic signals will have approximately the same propagation time over the loops.

However, there are issues in inverse multiplexing when the data rates of the loops are different. For example, inverse multiplexing information across two loops with one loop running at 19.2 kbps and another at 64 kbps presents problems. One non-limiting solution to this problem would be to assume that all loops will be adjusted to run at the speed of the lowest currently operating loop. Then a determination of the anticipated inverse multiplexing throughput is made. Next, drop out the lowest speed loops and redo the calculations. Once no loops remain, then the throughput for all the possible inverse multiplexing configurations with the loops running at the same data rate will be determined. Choosing the highest throughput configuration will tend to maximize performance, and some of the lowest data rate loops may well be dropped from the inverse multiplexing group, while some of the highest data rate loops may well have their data rate downgraded. With similar propagation delays and the same data rate on each loop in the multiplexed group, a simple round-robin inverse multiplexing scheme could be employed in assigning ATM cells to queues associated with particular loaded loops in the preferred embodiments of the present invention.

Various techniques can be used for physical layer inverse multiplexing and some non-limiting examples are discussed. One potential non-limiting physical layer inverse multiplexing technique might perform some of the following functions. First, equipment could measure the differential propagation delays across multiple modem receivers. Then, received data could be buffered to compensate for the differential delays. One non-limiting technique for measuring the delay might be to introduce an overhead channel that results in a reduction in overall throughput. Some potential problems with such an inverse multiplexing strategy might include lost capacity, detection of loss of one or more wire pairs, and/or a synchronization delay while waiting for the long training sequences of modems to complete.

Some patents and patent applications that are relevant to providing physical layer inverse multiplexing include: U.S. Pat. No. 4,630,286 to William L. Betts, entitled "Device for Synchronization of Multiple Telephone Circuits", filed on Oct. 10, 1984, and issued on Dec. 16, 1986, which is incorporated by reference in its entirety herein; U.S. Pat. No. 4,637,035 to William L. Betts, entitled "Digital Modem for Multiple Telephone Circuits", filed on Feb. 16, 1984, and issued on Jan. 13, 1987, which is incorporated by reference in its entirety herein; U.S. Pat. No. 4,734,920 to William L. Betts, entitled "High Speed Modem for Multiple Communication Circuits", filed on Oct. 10, 1984, and issued on Mar. 29, 1988, which is incorporated by reference in its entirety herein; U.S. Pat. No. 5,134,633 to Jean-Jacques Werner, entitled "Digital Communications Synchronization Scheme", filed on Nov. 30, 1990, and issued on Jul. 28, 1992, which is incorporated by reference in its entirety herein; U.S. Pat. No. 5,163,066 to Robert L. Cupo and Cecil W. Farrow, entitled "Synchronizing the Operation of Multiple Equalizers in a Digital Communications System", filed on Mar. 24, 1991, and issued on Nov. 10, 1992, which is incorporated by reference in its entirety herein; and U.S. Patent Application with Ser. No. 09/534,696, applied for by William L. Betts, entitled "Space Diversity Trellis Interleaver System and Method", and filed on Mar. 24, 2000, which is incorporated by reference in its entirety herein.

In general, U.S. Pat. No. 4,630,286 to Betts uses an out-of-band phase-shift synchronization signal to detect differential delay without the losses of data rate caused by overhead. Also, U.S. Pat. No. 4,637,035 to Betts generally identifies the use of a high-speed signal processor to handle multiple lower speed channels. In addition, U.S. Pat. No. 4,734,920 to Betts generally identifies a full multi-pair system using a single processor and measuring differential delay across the multiple pairs using the modem training sequence. Furthermore, U.S. Pat. No. 5,163,066 to Cupo et al. generally describes multi-pair equalizers, while U.S. Pat. No. 5,134,633 to Werner generally describes differential delay synchronization for a plurality of channels.

Furthermore, U.S. Patent Application with Ser. No. 09/534,696 of Betts describes several methods to allow independent data rates or constellation densities on each pair or loop. The method of a single processor handling multiple pairs has at least the advantages of space diversity, lower throughput delay, and reduced complexity, which are important in low symbol rate transmissions that would likely be used on loaded loops.

Moreover, the space diversity interleaving, which is described in the U.S. Patent Application with Ser. No. 09/534,696 of Betts, can be incorporated within the multiplexing/inverse multiplexing unit, 8555. Multiple LLTs 8650 and 8750 in conversion equipment 8550 may interleave their transmitted symbols on alternate time intervals between the pairs 8600 and 8700. This diversity will improve the performance of a trellis code if used by the LLT. Alternatively, a single LLT may operate at a higher symbol rate and transmit alternate symbols on first pair 8600 and then on second pair 8700. This reduces complexity by using fewer LLTs. It also reduces latency by operating at a higher symbol rate than would otherwise be supported on loaded loops. Trellis coding performance will be improved by alternately transmitting on the diversity pairs.

In the preferred embodiments of the present invention conversion equipment 7550 and 8550 may be located in a remote terminal (or DLC), in a Service Area Interface (SAI) cabinet, in a cross-connect cabinet, or in a network interface device (NID) box that is often mounted on the side of a customer premises. Obviously, placing the conversion equipment in a NID of a single dwelling home would likely not allow access to the aggregation and multiplexing advantages of FIG. 8 over FIG. 7. However, a NID on the side of a multi-unit apartment building might allow the multiplexing advantages of FIG. 8. In particular, while the preferred embodiments of the present invention will function as intended when placed in many parts of the network various locations do have advantages and disadvantages, A cross-connect box is a relatively good place for the conversion equipment because of the proximity to the customer premises such that the number of loops with more than one load coil between the conversion equipment and the customer premises DSL modem such as a ReachDSL modem or an ADSL modem will be reduced. Thus, placing the conversion equipment in a cross connect cabinet allows for more DSL service coverage. As a disadvantage, the cross-connect boxes generally are not very big and generally do not have a ready source of excess power.

Figure 9:
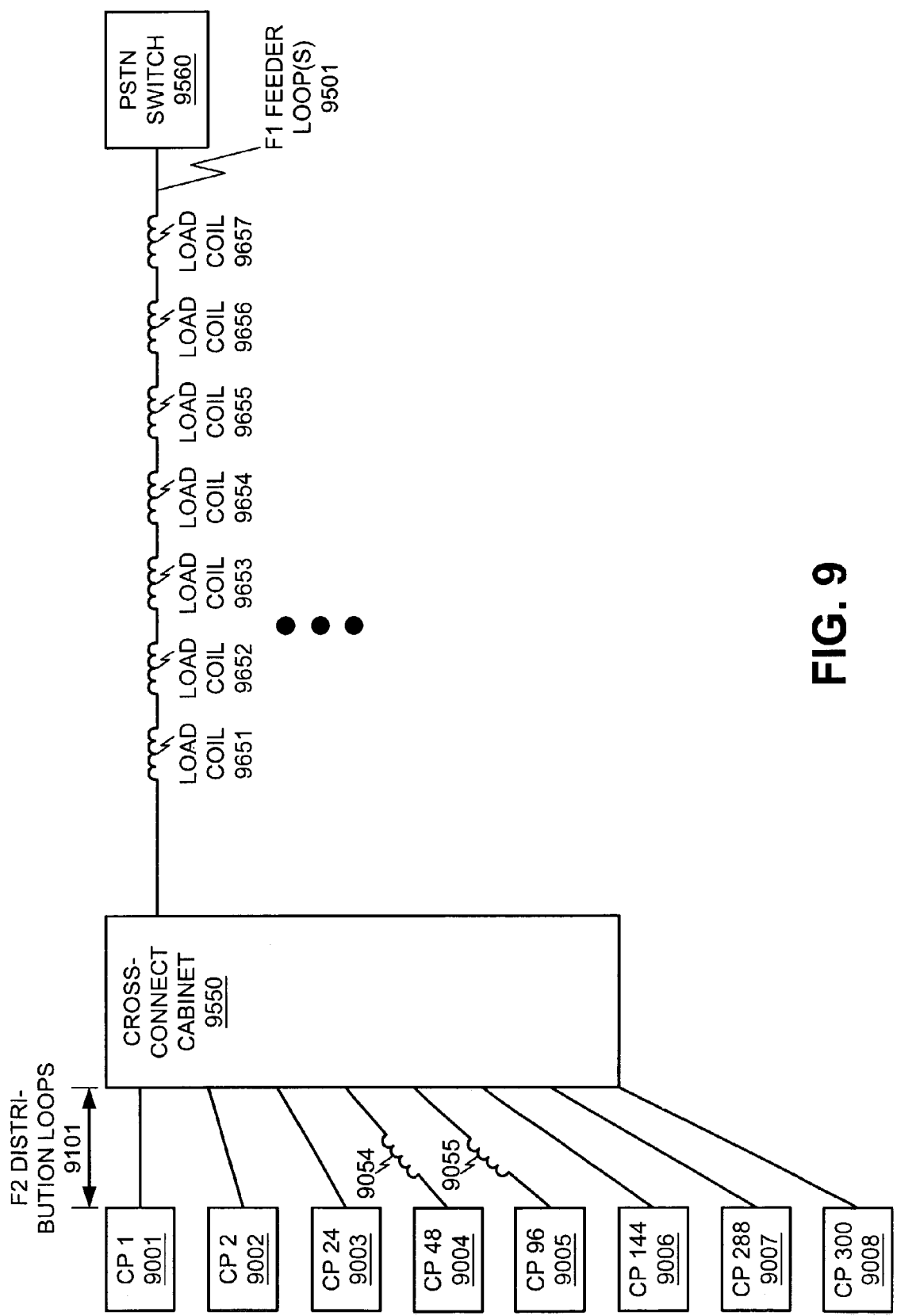
FIG. 9 is a block diagram of loaded F1 feeder loops as well as loaded and unloaded F2 distribution loops connected to a cross-connect cabinet.

FIG. 9 shows a potential network configuration, where the conversion equipment could be placed in a cross-connect box 9550. In general, the cross-connect box may be connected to many customer premises (CPs). Each customer premises may have POTS only service, DSL plus POTS service, or DSL only service. In FIG. 9, customer premises (CP) 1, 2, 24, 48, 96, 144, 288, and 300 with corresponding reference numbers 9001, 9002, 9003, 9004, 9005, 9006, 9007, and 9008 are connected over F2 distribution loops 9101 to cross-connect cabinet 9550. Because two of the F2 distribution loops 9101 to customer premises 9004 and 9005 each have a single load coil 9054 and 9055, respectively, standard ADSL generally will not work over these F2 distribution loops. Instead ReachDSL could be used to provide DSL service between the cross-connect cabinet 9550 and customer premises 9004 and 9005. The other F2 distribution loops to customer premises 9001, 9002, 9003, 9006, 9007, and 9008 do not have load coils and could be used to support ADSL or ReachDSL between the customer premises and conversion equipment added in the cross-connect cabinet 9550. The cross-connect cabinet 9550 further is connected over F1 feeder loops 9501 to a PSTN switch 9560 (or line cards in a DLC). The F1 feeder loops 9501, which were originally part of loaded analog POTS loops to customer premises, would be converted to digital service using loaded loop transceivers. In FIG. 9, the F1 feeder loop(s) 9501 have up to seven load coils 9651, 9652, 9653, 9654, 9655, 9656, and 9657.

Figure 10:
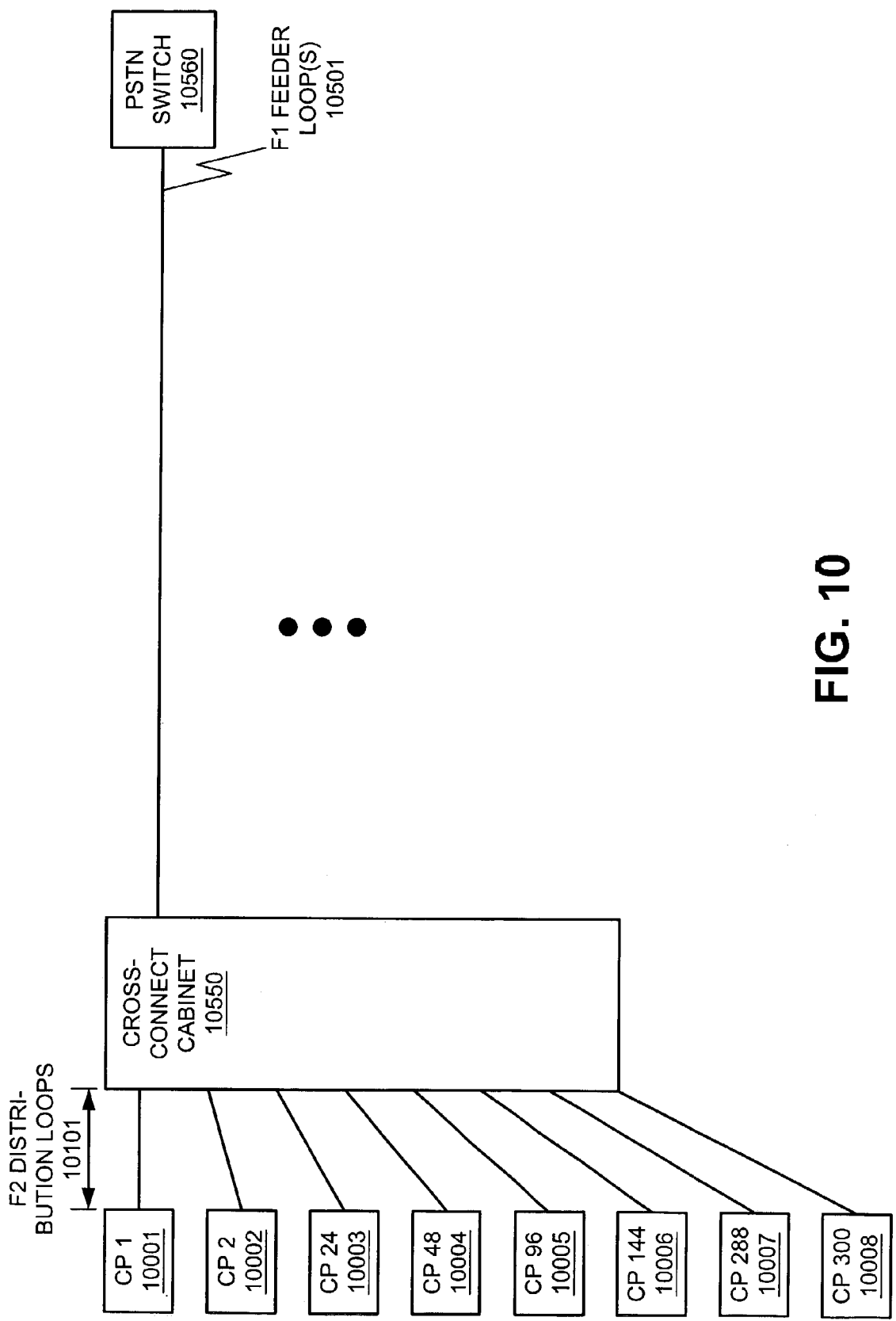
FIG. 10 is a block diagram of unloaded F1 feeder loops and unloaded F2 distribution loops connected to a cross-connect cabinet.

Although the preferred embodiments of the present invention have primarily been discussed with respect to loaded loops, the same equipment could operate over unloaded loops (as well as combinations of loaded and unloaded loops) with potentially even better performance. Thus, FIG. 10 shows a potential network configuration, where the conversion equipment could be placed in a cross-connect box 10550. In FIG. 10, there are no loaded loops. In general, the cross-connect box may be connected to many customer premises (CPs). Each customer premises may have POTS only service, DSL plus POTS service, or DSL only service. In FIG. 10, customer premises (CP) 1, 2, 24, 48, 96, 144, 288, and 300 with corresponding reference numbers 10001, 10002, 10003, 10004, 10005, 10006, 10007, and 10008 are connected over F2 distribution loops 10101 to cross-connect cabinet 10550. Because none of the F2 distribution loops 10101 to the customer premises have load coils, both ReachDSL and standard DSL would work in providing DSL communication between the customer premises and the conversion equipment that is installed in cross-connect cabinet 10550. The cross-connect cabinet 10550 further is connected over F1 feeder loops 10501 to a PSTN switch 10560 (or line cards in a DLC). The F1 feeder loops 10501, which were originally part of analog POTS loops to customer premises, would be converted to digital service.

Figure 11:
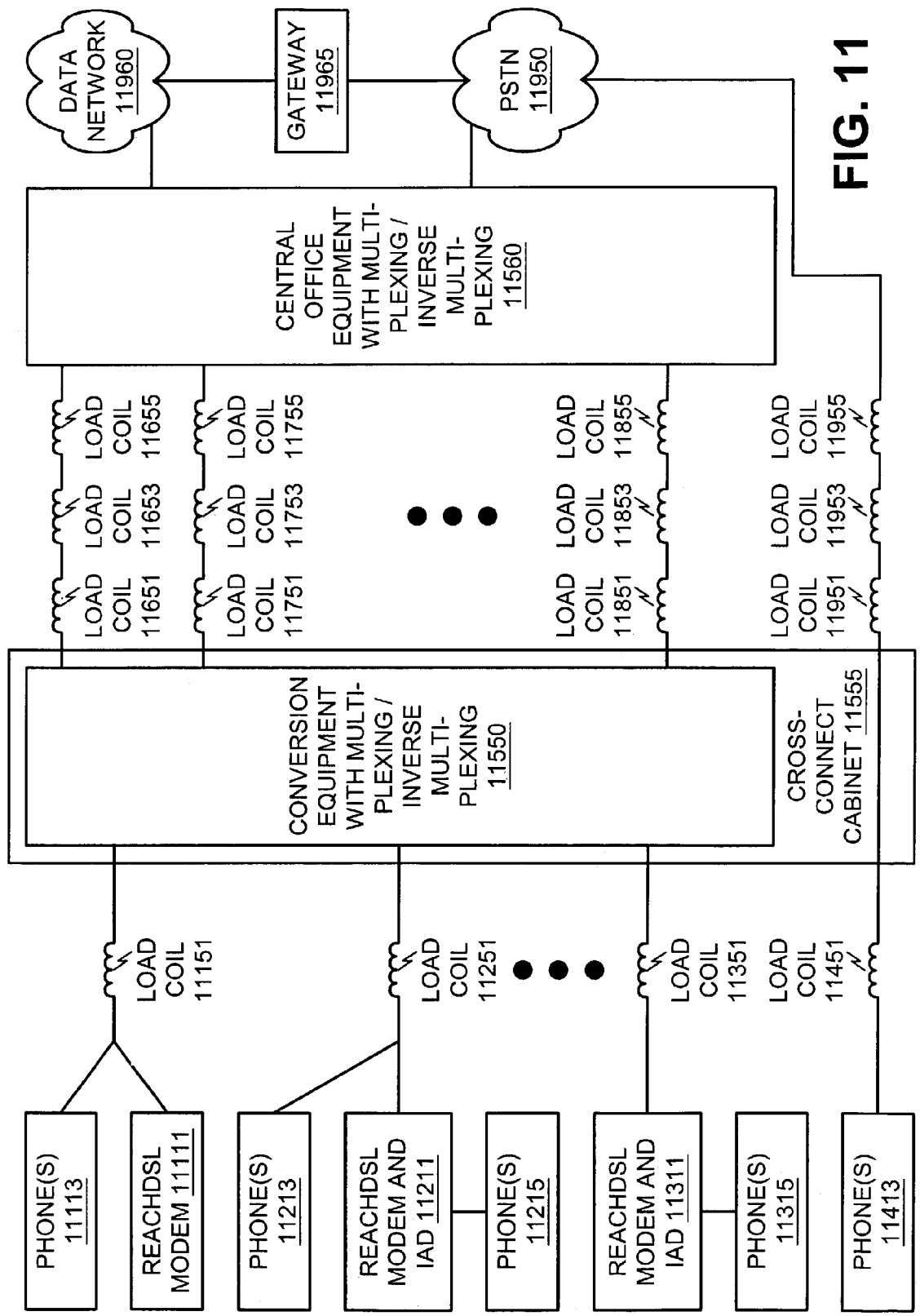
FIG. 11 is a block diagram showing the co-location of a cross-connect cabinet and conversion equipment that uses loaded loops in providing different types of DSL and POTS service to multiple customers.

FIG. 11 shows a more detailed configuration of placing the conversion equipment in a cross-connect box with various types of customer premises configurations. In FIG. 11, a first customer premises with ReachDSL modem 11111 and analog POTS phone(s) 11113 is connected to a subscriber loop (or a segment of a subscriber loop that did not change when the conversion equipment was installed). A second customer premises comprises ReachDSL modem and integrated access device (LAD) 11211 and a POTS phone 11213 that are directly connected to the subscriber loop with load coil 11251. POTS phone 11213 utilizes the native 0-4 KHz POTS interface. In contrast, the communication of phone(s) 11215 are carried in the DSL channel of the subscriber loop and generally involve digitized voice encodings that also are packetized for statistical multiplexing in the preferred embodiments of the present invention. The ReachDSL modem and IAD 11211 may provide a local POTS interface such that phone(s) 11215 are standard POTS phones with the IAD 11211 performing the necessary conversion for digital encoding and/or packetizing. Alternatively, phone(s) 11215 may provide its own digitized and/or packetized format that is just passed into the ReachDSL modem 11211.

In FIG. 11, a third customer premises comprises ReachDSL modem and integrated access device (IAD) 11311 without any native POTS service in the 0-4 KHz baseband of the subscriber loop. Instead, ReachDSL modem and integrated access device (IAD) 11311 offers a derived or synthesized voice service through phone(s) 11315. Often without local backup powering, such a configuration as the third customer premises loses phone service, when local power is lost at the customer premises. However, often a user at the third customer premises has other another lifeline service such as a cell phone or secondary POTS loop. FIG. 11 also shows a fourth customer premises with a POTS only service using POTS phone(s) 11413 over the loop with load coil 11451. The fourth customer premises also could be viewed as the secondary POTS lifeline loop at the third customer premises.

All four of the subscriber loops with load coils 11151, 11251, 11351, and 11451 connect to (or through) cross-connect cabinet 11555. Because the DSL subscriber loops all are shown in FIG. 11 having one load coil 11151, 11251, and 11351, ReachDSL is used on these loops instead of standard ADSL, which will not function even with the single load coil.

The DSL subscriber loops with one load coil 11151, 11251, and 11351 are terminated in conversion equipment with mux/imux 11550 in cross-connect cabinet 11555. Conversion equipment with mux/imux 11550 is connected over one or more loaded loops to central office-side equipment with mux/imux 11560. In FIG. 11, three loaded subscriber loops are arbitrarily shown between conversion equipment 11550 and CO-side equipment 11560. Each of these three loaded loops will have a pair of loaded loop transceivers (LLTs) located on each end of the loaded loops. Or alternatively, fewer LLTs, each transmitting symbols on multiple loaded loops to achieve the advantages of diversity, reduced complexity and reduced latency. FIG. 11 arbitrarily shows the first loaded loop between conversion equipment 11550 and CO-side equipment 11560 having load coils 11651, 11653, and 11655. In addition, FIG. 11 arbitrarily shows the second loaded loop between conversion equipment 11550 and CO-side equipment 11560 having load coils 11751, 11753, and 11755. Also, FIG. 11 arbitrarily shows the third loaded loop between conversion equipment 11550 and CO-side equipment 11560 having load coils 11851, 11853, and 11855.

Furthermore, FIG. 11 shows the basic POTS loop with load coils 11451, 11951, 11953, and 11955 passing through the cross-connect box 11555 without going into conversion equipment 11550 before terminating in a line card in PSTN 11950. In general, the PSTN uses A-law or μ-law PCM encoded voice in a fixed 56/64 kbps TDM format. In contrast, the derived or synthesized voice from phone(s) 11215 or 11315 may pass through data network 11960 using a different voice encoding than standard PCM and using the statistical time-division multiplexing (STDM) of packet switching. Gateway 11965 may be used to covert between different voice encoding and/or voice packetization formats.

Figure 12:
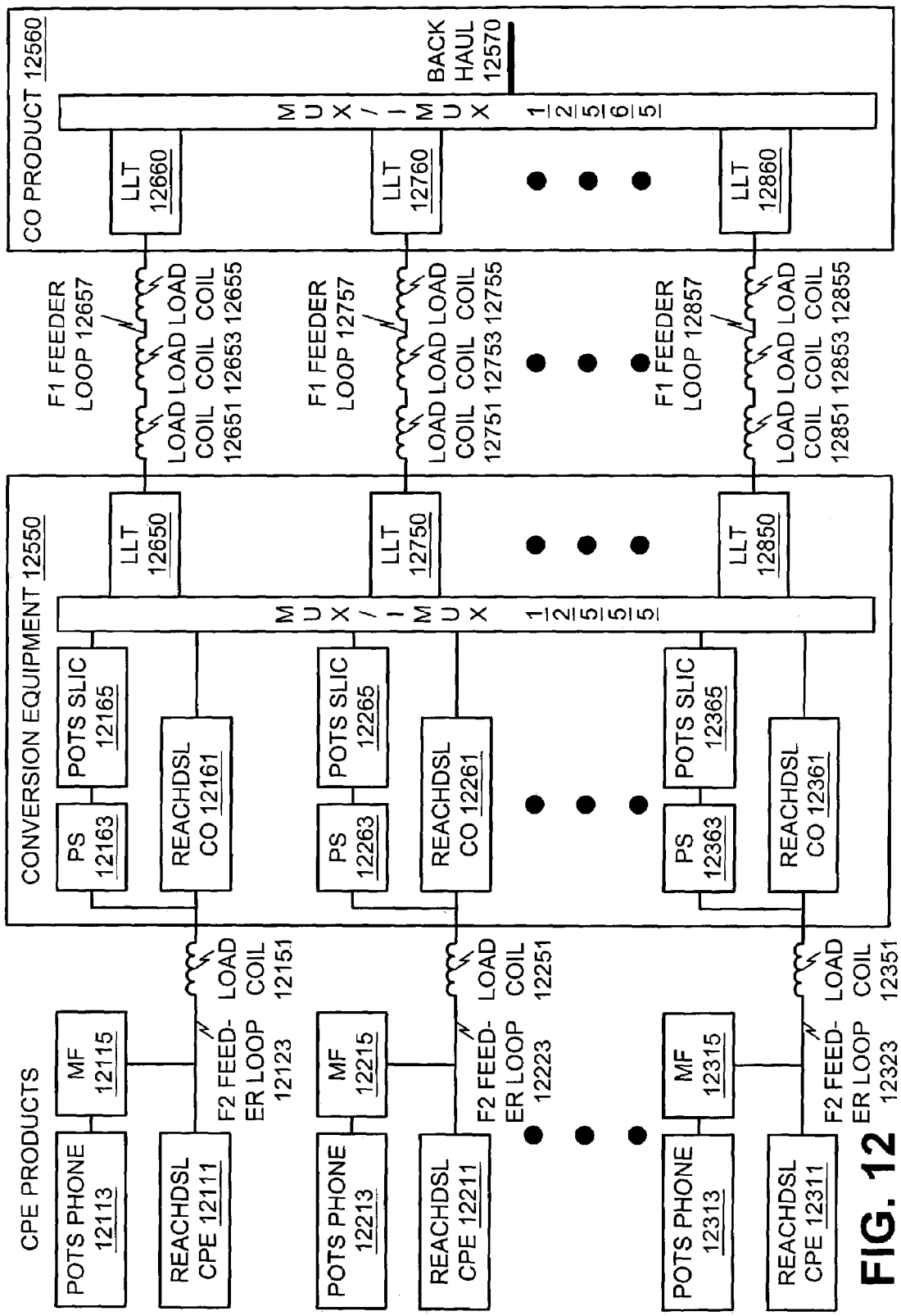
FIG. 12 is a block diagram showing more detail of conversion equipment in supporting multiple customers with DSL service.

Referring to FIG. 12, more detail is shown on conversion equipment 12550 that is arbitrarily connected to three customer premises. At the first customer premises ReachDSL CPE modem 12111 and POTS phone 12113 are connected to F2 feeder loop 12123, with the POTS phone 12113 using a microfilter (MF) 12115. ReachDSL CPE modem 12111 is connected over a loop with up to one load coil 12151 to ReachDSL CO modem 12161. In addition, F2 feeder loop 12123 connects to POTS splitter (PS) 12163, which is further connected to POTS subscriber line interface card (SLIC) 12165 that provides the CO-side of the native POTS interface to POTS phone 12113. At the second customer premises ReachDSL CPE modem 12211 and POTS phone 12213 are connected to F2 feeder loop 12223, with the POTS phone 12213 using a microfilter (MF) 12215. ReachDSL CPE modem 12211 is connected over a loop with up to one load coil 12251 to ReachDSL CO modem 12261. In addition, F2 feeder loop 12223 connects to POTS splitter (PS) 12263, which is further connected to POTS subscriber line interface card (SLIC) 12265 that provides the CO-side of the native POTS interface to POTS phone 12213. At the third customer premises ReachDSL CPE modem 12311 and POTS phone 12313 are connected to F2 feeder loop 12323, with the POTS phone 12313 using a microfilter (MF) 12315. ReachDSL CPE modem 12311 is connected over a loop with up to one load coil 12351 to ReachDSL CO modem 12361. In addition, F2 feeder loop 12323 connects to POTS splitter (PS) 12363, which is further connected to POTS subscriber line interface card (SLIC) 12365 that provides the CO-side of the native POTS interface to POTS phone 12313. One other item to note about the conversion equipment in FIG. 12, if native 0-4 KHz POTS service is not provided over to the customer premises, then the POTS splitters (PS) 12163, 12263, and 12363 as well as POTS SLICs 12165, 12265, and 12365 are not needed in the conversion equipment 12550. Removing these items from the conversion equipment 12550 lowers the amount of power needed by the conversion equipment, which is important when power is a very scarce resource as it is in a cross-connect box.

The conversion equipment 12550 further comprises multiplexer/inverse multiplexer (mux/imux) 12555 that multiplexes the different digital information flows from DSL data channels and from digitized POTS interfaces that terminate the native 0-4 KHz POTS baseband channels. These information flows are then inverse multiplexed across multiple loaded F1 feeder loops back to the CO-side product or equipment 12560. Each F1 feeder loop (12657, 12757, and 12857) is connected between pairs of loaded loop transceivers (LLTs) (12650/12660, 12750/12760, and 12850/12860, respectively). In FIG. 12, F1 feeder loop 12657 arbitrarily has three load coils 12651, 12653, and 12655. Also, F1 feeder loop 12757 arbitrarily has three load coils 12751, 12753, and 12755. In addition, F1 feeder loop 12857 arbitrarily has three load coils 12851, 12853, and 12855. The CO-side product 12560 comprises loaded loop transceivers (LLTs) 12660, 12760, and 12860, which are connected to multiplexer/inverse multiplexer 12565. Or alternatively, fewer LLTs, each transmitting and receiving symbols on multiple loaded loops to achieve the advantages of diversity, reduced complexity and reduced latency. For example, LLT 12660 could transmit/receive symbols sequentially on F1 feeder loops 12657, 12757 and 12857 to LLT 12650, eliminating the requirement for LLTs 12760, 12860, 12750 and 12850. Inverse multiplexer 12565 may be connected to a high-speed backhaul 12570 that carries both the digitized POTS voice and the DSL data in a packetized, statistical multiplexing format. ATM's QoS mechanisms can be used to prioritize queuing of different ATM cells onto the high-speed backhaul 12570, which in a non-limiting case may just be a single high-speed channel offering ATM's statistical multiplexing.

Figure 13:
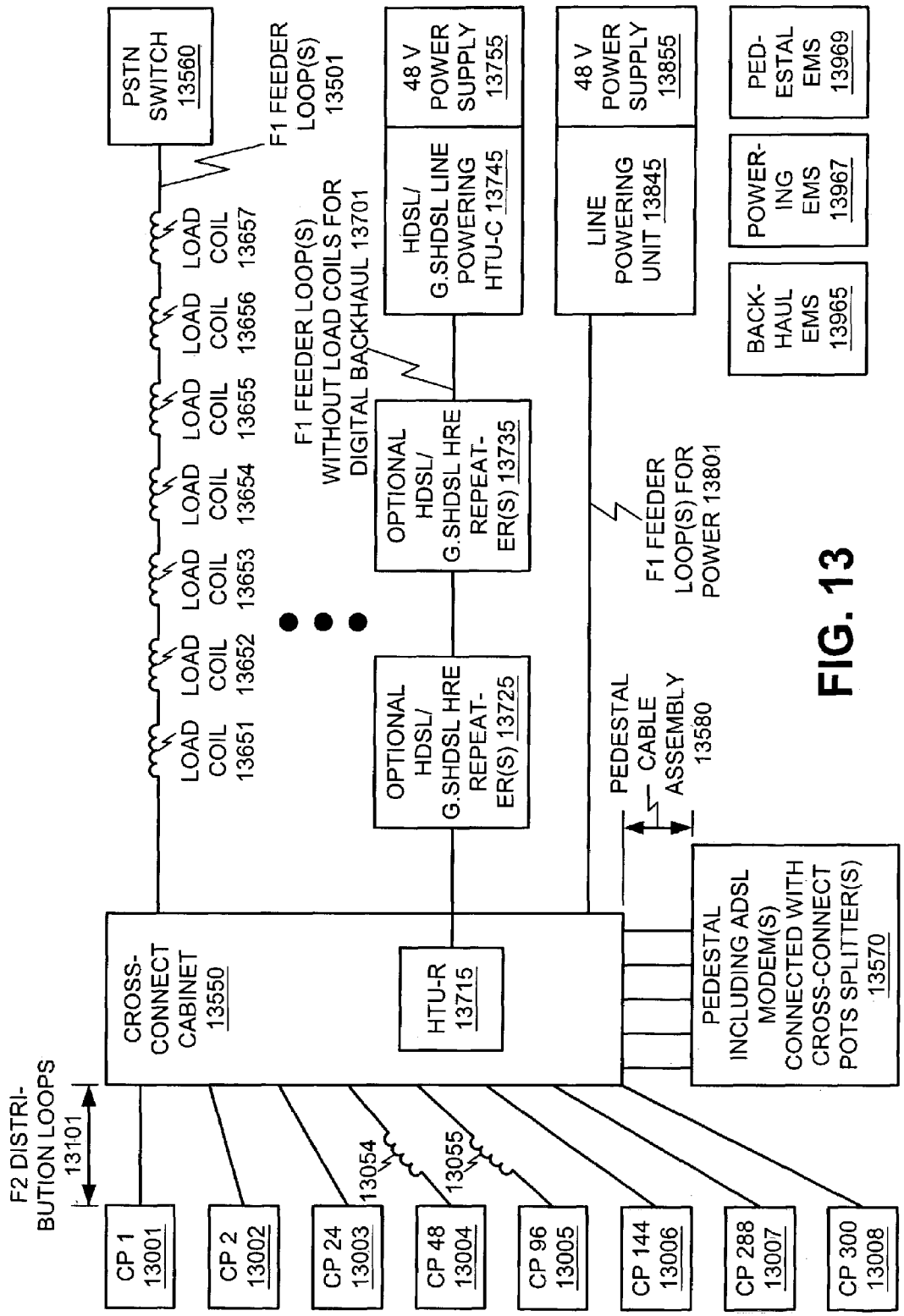
FIG. 13 is a block diagram shown one approach that attempts to successfully provide DSL service from a cross-connect box over loaded loops.

FIG. 13 shows a traditional approach to potentially offering DSL service out of a cross-connect cabinet 13550. In FIG. 13, customer premises 1, 2, 24, 48, 96, 144, 288, and 300 (with reference numbers 13001, 13002, 13003, 13004, 13005, 13006, 13007, and 13008) are connected to cross-connect cabinet 13550 over F2 distribution loops 13101. As shown in FIG. 13, the F2 distribution loops 13101 to customer premises 13004 and 13005 contain load coils 13054 and 13055 respectively. As such, standard ADSL will not work over these loops to customer premises 13004 and 13005, but ReachDSL will work over loops with a single load coil. Using a traditional-type of approach to providing DSL out of a cross-connect cabinet 13550, each customer premises that includes a native 0-4 KHz POTS interface plus DSL service must be associated with its own F1 feeder loop 13501 back to a line card in a PSTN switch 13560 or DLC. These F1 feeder loops 13501 for connecting the native POTS service back to line cards may have multiple load coils arbitrarily shown as load coils 13651, 13652, 13653, 13654, 13655, 13656, and 13657, with seven load coils normally being the maximum found on a loop. Basically, a traditional approach might involve trying to co-locate a DSLAM with a cross-connect cabinet 13550. A DSLAM with multiple ADSL modems might be placed in a separate pedestal 13570 outside the cross-connect cabinet 13550. Such a DSLAM in a pedestal 13570 would also need CO-side POTS splitters to isolate the frequency-division multiplexed 0-4 KHz native POTS channel from the DSL channel. However, unlike standard DSL CO-side POTS splitters that normally are located close to the POTS line card in a switch or DLC, the CO-side POTS splitters would basically be located in the middle of the POTS loop transmission line as opposed to being near the end of the POTS loop transmission line. Thus, the CO-side POTS splitters in the pedestal including ADSL modems (i.e., a DSLAM) connected with cross-connect POTS splitters 13570 would desirably have different filtering characteristics than standard CO side POTS splitters. Therefore, these CO-side POTS splitters here are referred to as "cross-connected POTS splitters."

Furthermore, another drawback of FIG. 13 is that the cross-connect POTS splitters in item 13570 end up being connected in series with the POTS service from the PSTN switch 13560 to the customer premises. As a result, the native 0-4 KHz POTS service to a customer premises may fail if circuitry failure (from an event such as but not limited to loss of power) occurs in the pedestal 13570 or if the pedestal cable assembly 13580 fails. Because the pedestal 13570 is external to the cross-connect cabinet 13550, various environmental events, humans, or animals may cause the pedestal cable assembly 13580 to be damaged. Such a loss of basic POTS service that is considered a minimum acceptable lifeline may result in legal liabilities for service providers.

Moreover, a traditional DSL methodology of trying to co-locate a standard DSLAM with a cross-connect cabinet 13550 needs a digital backhaul link that normally carries statistically multiplexed DSL data traffic. In FIG. 13, remote HDSL transceiver unit (HTU-R) 13715 is used for backhaul from the DSLAM. The HDSL link may need one or more optional HDSL/G.SHDSL HRE repeater(s) 13725 and 13735 depending on the length of loop used for the HDSL backhaul. Also, HDSL does not work over loaded loops. Thus, the load coils need to be removed from the F1 feeder loops 13701 that are used for digital backhaul from the DSLAM. The other items in FIG. 13 generally are associated with providing power to the equipment needed to support a traditional approach to co-locating a DSLAM with a cross-connect cabinet 13550. HDSL/G.SHDSL Line powering HTU-C 13745 is a central HDSL transceiver unit that also provides line power for the HDSL backhaul equipment. One skilled in the art will be aware that 48 volt power supplies 13755 and 13855 are commonly found in central offices and some other locations in service provider networks such as in a DLC cabinet to power the DLC TDM multiplexing equipment. 48 volt powering normally is not immediately available in cross-connect cabinets 13550. Line powering unit 13845 provides power to the DSLAM in pedestal 13570 over F1 feeder loops for power 13801. Backhaul element management system (EMS) 13965, powering element management system (EMS) 13967, and pedestal element management system (EMS) 13969 are used for management and status monitoring of the various network equipment elements.

Figure 14:
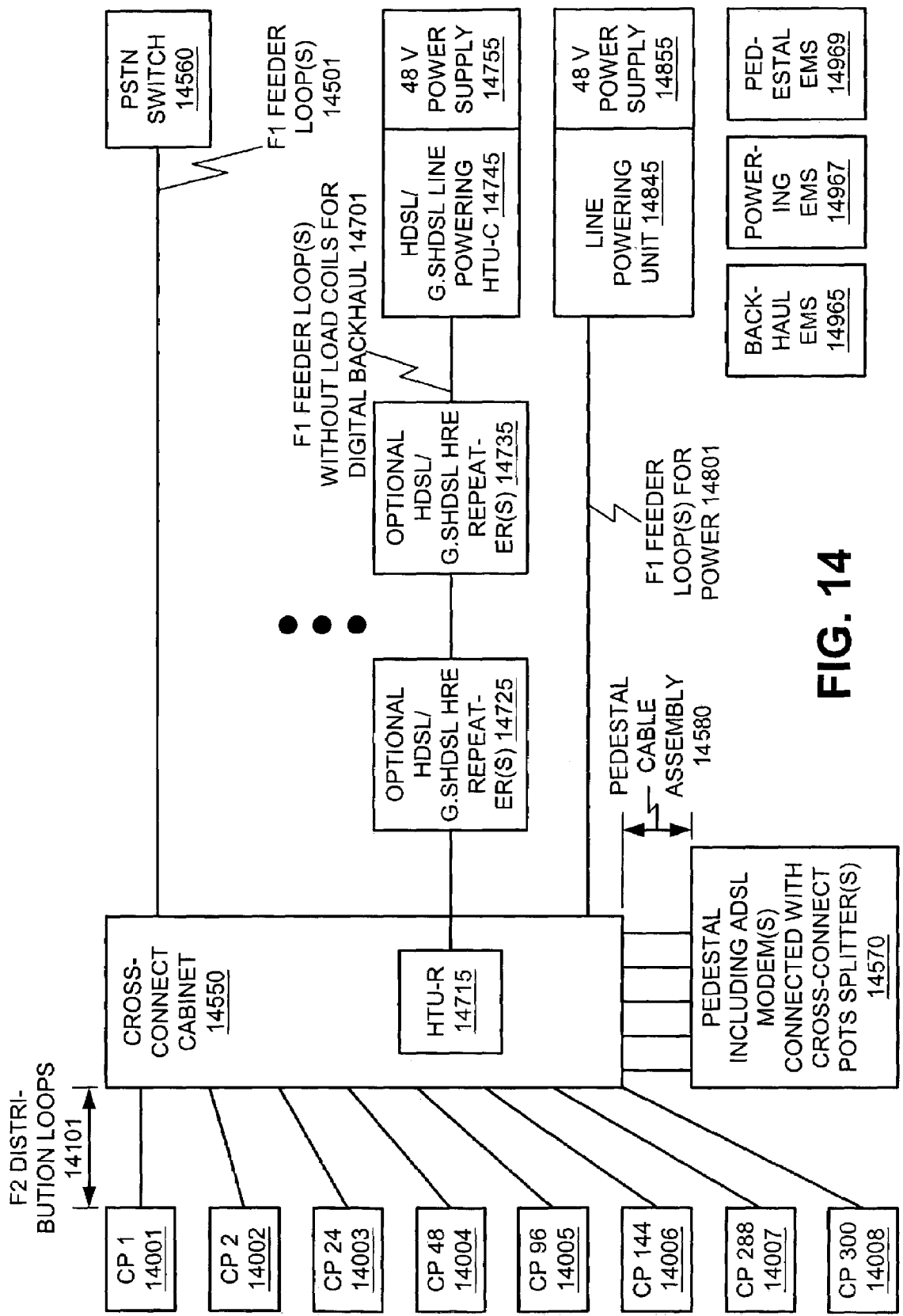
FIG. 14 is a block diagram showing one approach that attempts to successfully provide DSL service from a cross-connect box over unloaded loops.

From the description of FIG. 13, it is clear that a traditional approach to providing DSL service out of a cross-connect cabinet 13550 has many serious disadvantages. FIG. 14 shows the same ill-advised approach for providing DSL service out of a cross-connect cabinet 14550 even in the absence of load coils. In FIG. 14, customer premises 1, 2, 24, 48, 96, 144, 288, and 300 (with reference numbers 14001, 14002, 14003, 14004, 14005, 14006, 14007, and 14008) are connected to cross-connect cabinet 14550 over F2 distribution loops 14101. As shown in FIG. 14, none of the F2 distribution loops 14101 to customer premises contain load coils so either ReachDSL or standard ADSL will work between the customer premises and the cross-connect cabinet 14550. Using a traditional-type of approach to providing DSL out of a cross-connect cabinet 14550, each customer premises that includes a native 0-4 KHz POTS interface plus DSL service must be associated with its own F1 feeder loop 14501 back to a line card in a PSTN switch 14560 or DLC. Basically, a traditional approach might involve trying to co-locate a DSLAM with a cross-connect cabinet 14550. A DSLAM with multiple ADSL modems might be placed in a separate pedestal 14570 outside the cross-connect cabinet 14550. Such a DSLAM in a pedestal 14570 would also need CO-side POTS splitters to isolate the frequency division multiplexed 0-4 KHz native POTS channel from the DSL channel. However, unlike standard DSL CO-side POTS splitters that normally are located close to the POTS line card in a switch or DLC, the CO-side POTS splitters would basically be located in the middle of the POTS loop transmission line as opposed to being near the end of the POTS loop transmission line. Thus, the CO side POTS splitters in the pedestal including ADSL modems (i.e., a DSLAM) connected with cross-connect POTS splitters 14570 would desirably have different filtering characteristics than standard CO-side POTS splitters. Therefore, these CO-side POTS splitters here are referred to as "cross-connected POTS splitters."

Furthermore, another drawback of FIG. 14 is that the cross-connect POTS splitters in item 14570 end up being connected in series with the POTS service from the PSTN switch 14560 to the customer premises. As a result, the native 0-4 KHz POTS service to a customer premises may fail if circuitry failure (from an event such as but not limited to loss of power) occurs in the pedestal 14570 or if the pedestal cable assembly 14580 fails. Because the pedestal 14570 is external to the cross-connect cabinet 14550, various environmental events, humans, or animals may cause the pedestal cable assembly 14580 to be damaged. Such a loss of basic POTS service that is considered a minimum acceptable lifeline may result in legal liabilities for service providers.

Moreover, a traditional DSL methodology of trying to co-locate a standard DSLAM with a cross-connect cabinet 14550 needs a digital backhaul link that normally carries statistically multiplexed DSL data traffic. In FIG. 14, remote HDSL transceiver unit (HTU-R) 14715 is used for backhaul from the DSLAM. The HDSL link may need one or more optional HDSL/G.SHDSL HRE repeater(s) 14725 and 14735 depending on the length of loop used for the HDSL backhaul. Also, HDSL does not work over loaded loops. Thus, the load coils need to be removed from the F1 feeder loops 14701 that are used for digital backhaul from the DSLAM. The other items in FIG. 14 generally are associated with providing power to the equipment needed to support a traditional approach to co-locating a DSLAM with a cross-connect cabinet 14550. HDSL/G.SHDSL Line powering HTU-C 14745 is a central HDSL transceiver unit that also provides line power for the HDSL backhaul equipment. One skilled in the art will be aware that 48 volt power supplies 14755 and 14855 are commonly found in central offices and some other locations in service provider networks such as in a DLC cabinet to power the DLC TDM multiplexing equipment. 48 volt powering normally is not immediately available in cross-connect cabinets 14550. Line powering unit 14845 provides power to the DSLAM in pedestal 14570 over F1 feeder loops for power 14801. Backhaul element management system (EMS) 14965, powering element management system (EMS) 14967, and pedestal element management system (EMS) 14969 are used for management and status monitoring of the various network equipment elements.

Figure 15:
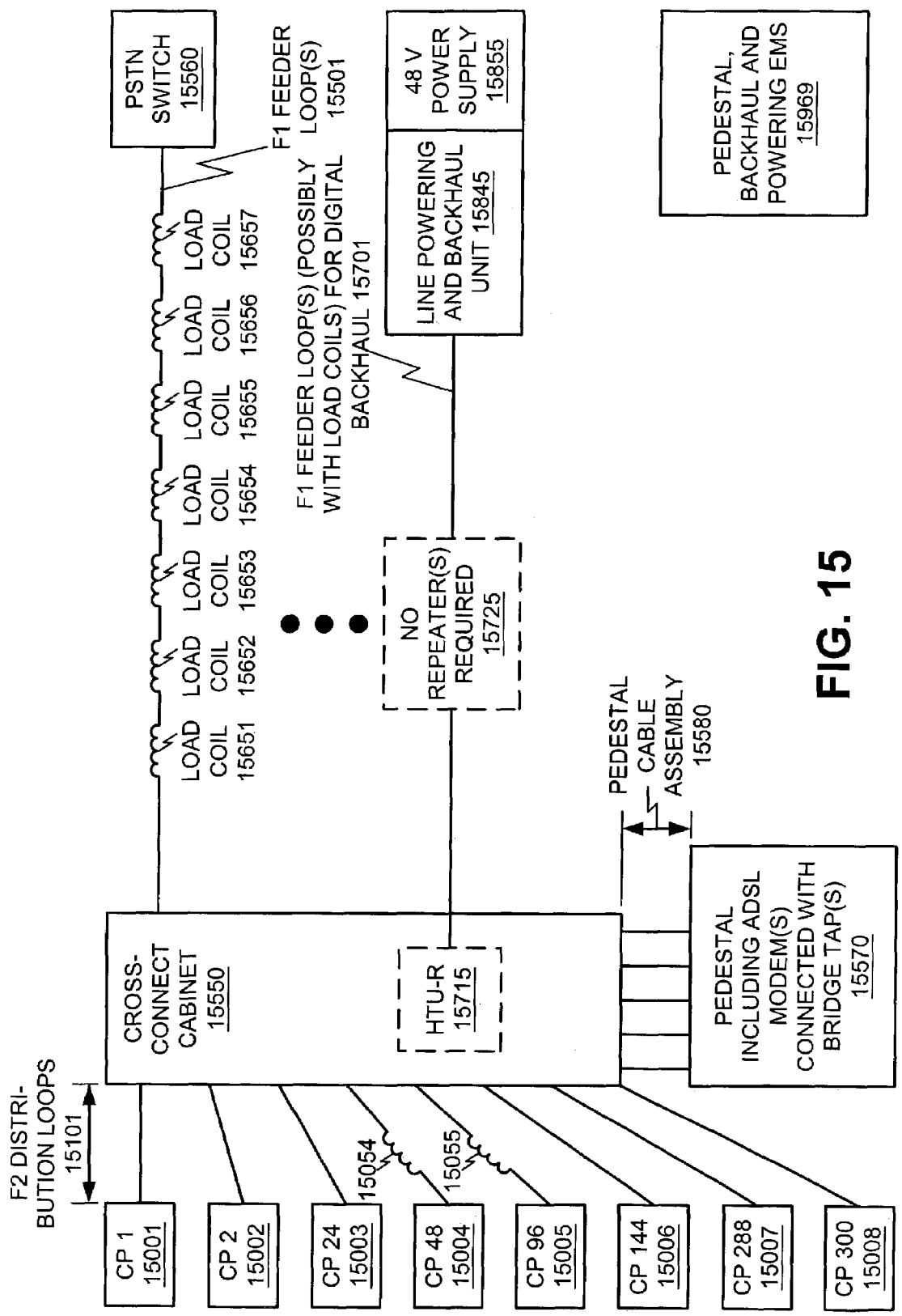
FIG. 15 is a block diagram showing an indirect DSL approach that successfully provides DSL service from a cross-connect box over loaded loops and/or unloaded loops for backhaul.

FIG. 15 shows a much better approach to providing DSL service from a cross-connect cabinet 15550 using the preferred embodiments of the present invention. In FIG. 15, customer premises 1, 2, 24, 48, 96, 144, 288, and 300 (with reference numbers 15001, 15002, 15003, 15004, 15005, 15006, 15007, and 15008) are connected to cross-connect cabinet 15550 over F2 distribution loops 15101. As shown in FIG. 15, the F2 distribution loops 15101 to customer premises 15004 and 15005 contain load coils 15054 and 15055 respectively. As such, standard ADSL will not work over these loops to customer premises 15004 and 15005, but ReachDSL will work over loops with a single load coil. Using an approach that utilizes the preferred embodiments of the present invention to provide DSL out of a cross-connect cabinet 15550, each customer premises that includes a native 0-4 KHz POTS interface plus DSL service no longer requires its own, unshared segment of a POTS loop from the cross-connect cabinet 15550 back to a line card in a PSTN switch 15560 or a DLC. These F1 feeder loops 15501 that were used for connecting the native POTS service back to line cards may have multiple load coils arbitrarily shown as load coils 15651, 15652, 15653, 15654, 15655, 15656, and 15657, with seven load coils normally being the maximum found on a loop. However, these F1 feeder loops that had been used just for POTS service are freed up when a customer adds DSL capability on his F2 distribution local loop over which he will still be provided with a native POTS interface through the conversion equipment. The freed up F1 feeder loops can be used for other purposes such as, but not limited to, providing additional loops for the inverse multiplexed backhaul between the conversion equipment and the central office-side equipment. Furthermore, the preferred embodiments of the present invention do not require that the customer's native POTS service is provided through digitized voice capability in the conversion equipment. One or more customers may be wired such that the POTS service is still delivered over a POTS loop directly from a CO or DLC line card instead of through a line card associated with the conversion equipment.

In the situation of FIG. 15, co-locating the conversion equipment (comprising CO-side ADSL and/or ReachDSL modems, POTS subscriber line cards (SLICs), multiplexing/inverse multiplexing equipment, and loaded loop transceivers) allows DSL service to be offered over F2 distribution loops with loaded or unloaded F1 feeder loops as backhaul for both DSL data and digitized POTS that is used to support the native 0-4 KHz POTS interface to a customer premises. Such conversion equipment including ADSL (or ReachDSL) modems can be placed in an external pedestal 15570 that is connected to the customer premises by being bridged onto the subscriber loops through pedestal cable assembly 15580. Unlike FIGS. 13 and 14, the bridged connections to pedestal 15570 in FIG. 15 do not present the same POTS service reliability risks that occur with the series wiring of a POTS splitter through an external cable in FIGS. 13 and 14. Thus, the configuration of FIG. 15 is more immune to various environmental events, humans, and animals that may cause the pedestal cable assembly 15580 to be broken. If the conversion equipment loses power, then digitized POTS services may go down. However, for any customers whose native POTS service is provided from a line card in a CO or DLC that still has power, the bridged connection of conversion equipment allows the customer loop to still provide POTS service even though DSL service over that customer loop will fail when the conversion equipment loses power.

Additionally, unlike FIGS. 13 and 14 HTU-R 15715 and repeaters 15725 are not required for backhauling the DSL service. Instead, the loaded and/or unloaded F1 feeder loops 15701 carry both the digitized voice and the DSL data. In addition, performance generally will be better over a single unloaded loop than a singled loaded loop. However, the inverse multiplexing in conversion equipment allows utilization of multiple loaded and/or unloaded loops for communicating the DSL data and digitized POTS voice through backhaul unit 15845 that also provides line powering to the conversion equipment in pedestal 15570 by using 48 volt power supply 15855. Unlike FIGS. 13 and 14, the element management system (EMS) for the pedestal, backhaul, and powering 15969 is integrated together simplifying network management.

Using the concepts of inverse multiplexing, repeaterless backhaul can be provided on loaded or unloaded loops. Generally, extending the transmission line distance between two communication devices lowers the potential channel capacity of the transmission line, other things being equal. Repeaters are one solution to this problem by keeping the data rate high by basically lowering the distance over which digital signals have to propagate before a clean copy of the information can be regenerated at a repeater. In general, backhauling requires among other things meeting some minimum data rate requirements for serving the acceptable contention ratios of the backhaul link. The preferred embodiments of the present invention include inverse multiplexing that can effectively support a large bit rate capacity between the conversion equipment and the CO-side equipment by utilizing a large enough number of potentially low capacity loops. As the distance that the data has to be backhauled increases, the bit rate capacities of the loops generally decrease. However, this decrease in the bit rate capacities of the loops can be compensated for by using inverse multiplexing to gather together enough loops to meet the data rate requirements for backhauling customer data given various service level and contention criteria. Thus, the inverse multiplexing of the preferred embodiments of the present invention also helps to resolve the repeater problem for backhauling the DSL data (and potentially the digitized POTS).

Figure 16:
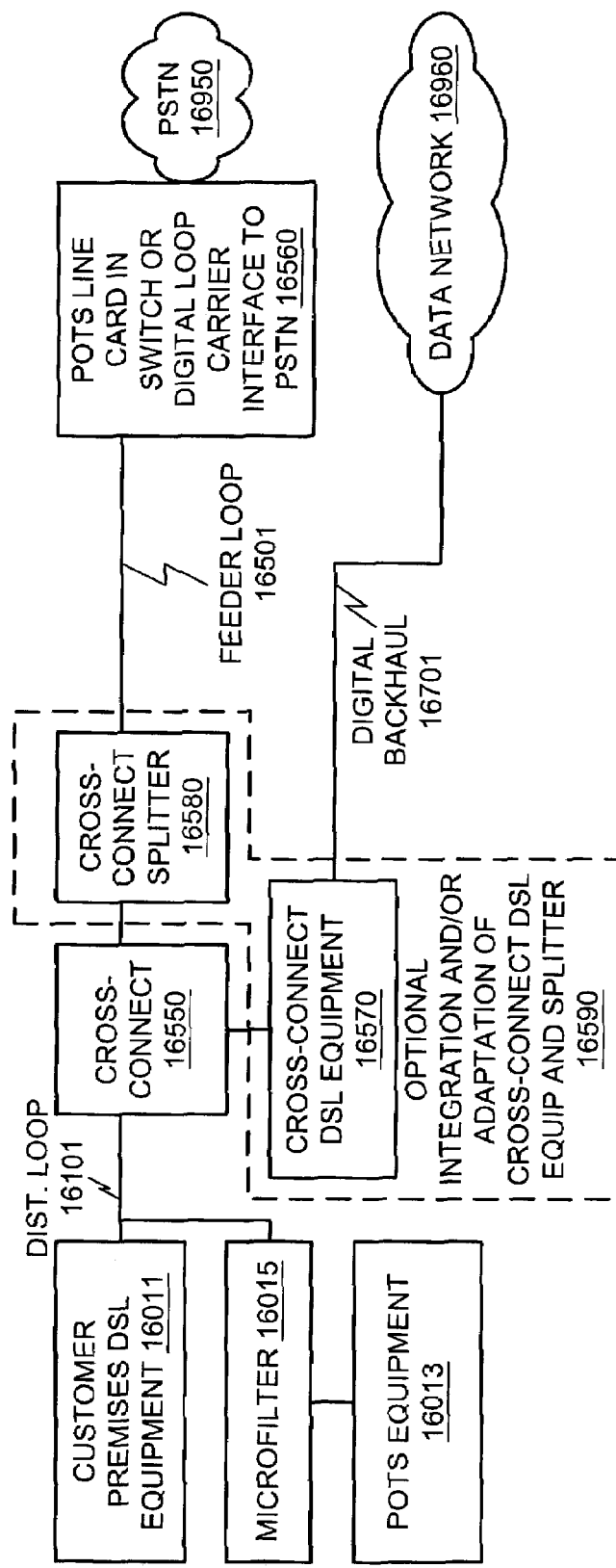
FIG. 16 is a block diagram showing the potential wiring problems of the approaches in FIGS. 13 and 14 that create reliability problems for lifeline POTS service.

FIG. 16 shows more detail of the wiring problem from FIGS. 13 and 14 that results in the potential POTS reliability issue. In FIG. 16, customer premises DSL equipment 16011 and POTS equipment 16013 via microfilter 16015 are connected to F2 distribution loop 16101. The F2 distribution loop 16101 connects the customer premises with cross-connect box 16550. Cross-connect DSL equipment 16570 generally would be a DSLAM with multiple DSL modems that is co-located with the cross-connect box 16550. In addition, to provide standard filtering that keeps the high-frequency DSL signals away from the POTS line card a POTS splitter is used between the line card and the portion of the loop carrying DSL signals. Because the filtering of the splitter should be optimized for connection along the middle of the POTS transmission line instead of near the end, the POTS splitter is different than a normal POTS splitter, and FIG. 16 shows the POTS splitter as cross-connect splitter 16580. Unfortunately cross-connect splitter 16580 is in series with the POTS interface and generally would be physically connected to the cross-connect box 16550 through an external cable that is subject to failure. Even integrating the cross-connect splitter and the cross-connect DSL equipment 16590 into the same piece of equipment does not solve the problem as the series wiring of the cross-connect splitter 16580 results in a cable through which POTS service passes. The cross-connect splitter 16580 further connects over an F1 feeder loop to a POTS line card in a switch or DLC 16560 that interfaces to the PSTN 16950. The cross-connect DSL equipment 16570 such as a DSLAM has some type of digital backhaul 16701 connection to a data network 16960.

Figure 17:
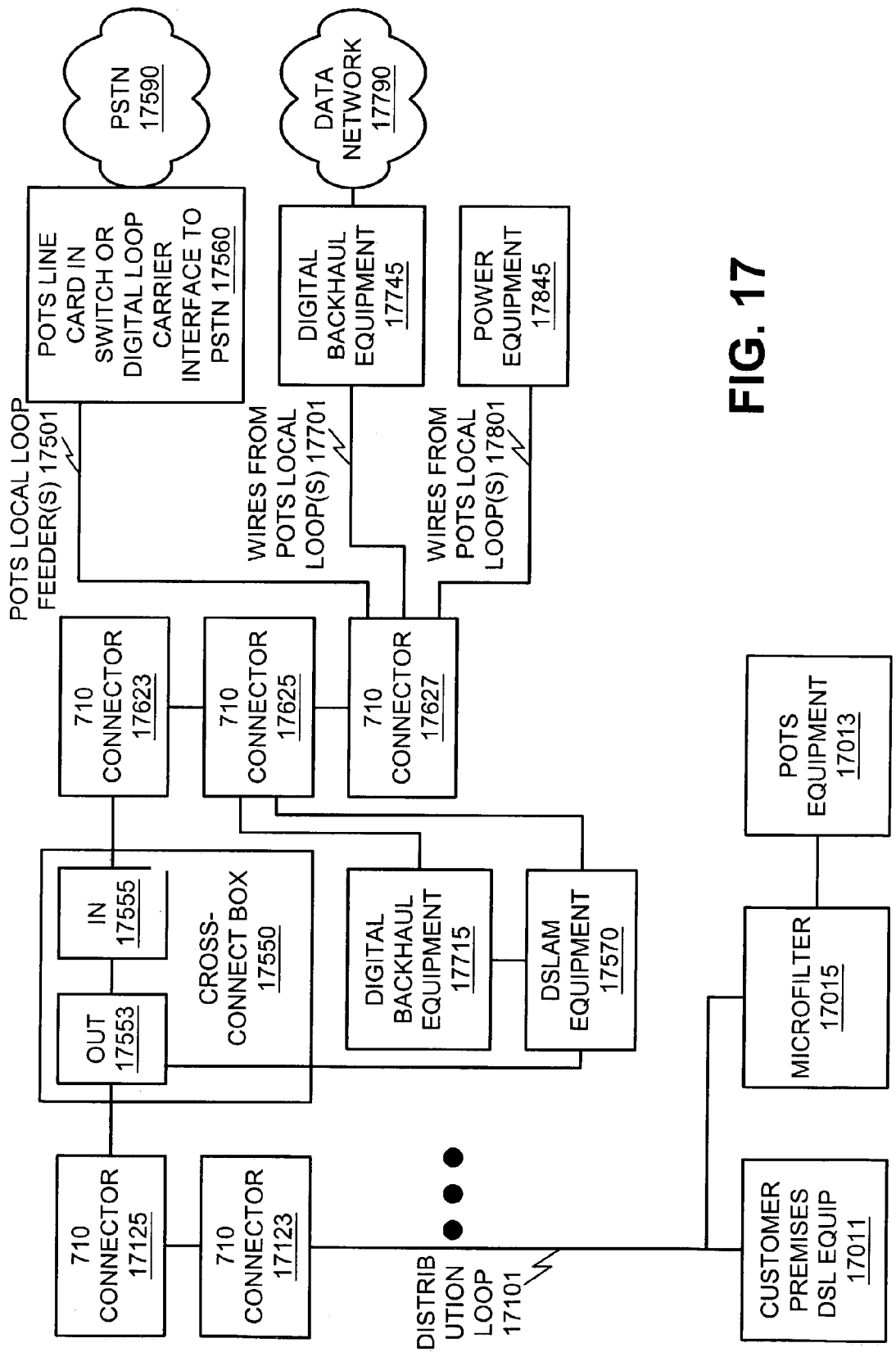
FIG. 17 is a block diagram showing the potential connections for bridging the DSL service onto subscriber loops without creating the POTS reliability problems.

FIG. 17 shows a potential wiring configuration for offering DSL service out of a cross-connect box 17550. In FIG. 17, a customer premises comprises customer premises DSL equipment 17011, a microfilter 17015, and POTS equipment 17013 that allow the customer to use distribution loop 17101 for both POTS and DSL. As one skilled in the art will be aware, 710 connectors are commonly used for making connections to cross-connect boxes 17550. 710 connectors 17123 and 17125 might normally be used for connecting customer premises loops to cross-connect box 17550 even without the addition of DSL service provided through cross-connect box 17550. Normally, a cross-connect box has out terminals 17553 or junction points and in terminals or junction points 17555 for the incoming and outgoing wire pairs relative to the CO. As shown in FIG. 17, 710 connectors 17623 and 17627 might normally be used for connecting customer premises loops to cross-connect box 17550 even without the addition of DSL service provided through cross-connect box 17550. 710 connector 17625 is added in between 710 connectors 17623 and 17627 to support DSL service from cross-connect box 17550. DSLAM equipment 17570 is connected to out terminals 17553 to support the DSL modulation over the distribution loop 17101, and also is connected to digital backhaul equipment 17715 for generally statistically multiplexing the data from multiple DSL modems to backhaul it to a data network 17790. DSLAM equipment 17570 needs some form of powering and might be line powered through a connection to 710 connector 17625. Digital backhaul also needs some form of power and might use a connection to 710 connector 17625 for line powering the backhaul loops. 710 connector 17627 includes connections to POTS F1 local loop feeders 17501, some wires from unused local POTS loops 17701 that are used for digital backhaul, and some wires from unused local POTS loops 17801. The various POTS local loops are connected back to POTS line cards 17560, digital backhaul equipment 17745, and power equipment 17845. The POTS line cards 17560 provide PSTN connectivity, while the digital backhaul equipment provides data network 17790 connectivity.

The wiring of FIG. 17 is allowed without the use of a splitter by utilizing the concepts of U.S. Pat. No. 6,111,936 to Gordon Bremer, entitled "Method and Apparatus for Automatically Detecting and Measuring Distortion in a DSL system", filed on Jan. 28, 1999, and issued on Aug. 29, 2000, which is incorporated by reference in its entirety herein. In general, U.S. Pat. No. 6,111,936 teaches how distortion caused by a DSL signal can be determined with the DSL signal. Then, the DSL signal and/or the power spectral density (PSD) can be altered to suitably reduce or eliminate the distortion effects, which normally would be reduced by a POTS splitter. As a result of such adjustments to the DSL signal, the POTS band noise is suitably reduced to resolve potential adverse POTS quality issues. In addition, the DSL performance can be improved as well as the undesirable distortion is reduced. Thus, the wiring of FIG. 17 could be called "splitterless" DSL, and it allows the DSL equipment to be connected to subscriber loops without needing a POTS splitter. This splitterless DSL configuration that utilizes the concepts of U.S. Pat. No. 6,111,936 may be used with conversion equipment utilized to provide indirect DSL service over loaded and/or unloaded loops. In addition, the splitterless DSL configuration also will work with normal DSLAMs.

Thus, the preferred embodiments of the present invention provide advances over the existing technology for loaded loop communication and allow deployment of DSL technology at higher communication rates without the need for reengineering subscriber loops to remove load coils. Such a solution allows telecommunications service providers to offer higher grade service to additional customers without absorbing the costs to rewire the multitude of loaded subscriber loops in the networks of service providers. Furthermore, the preferred embodiments of the present invention will work while still allowing the loaded subscriber loop to support both DSL data communication and POTS service. Various priority arbitration mechanisms can be used to implement policies for deciding when the 0-4 KHz baseband frequency is utilized for DSL service or POTS service. In addition, various techniques can be used to make DSL service appear to be always-on even though DSL service may be halted in some situations of long duration use of the 0-4 KHz baseband frequency for POTS service.

It should be emphasized that the above-described preferred embodiments of the present invention, particularly, any "preferred" preferred embodiments, are merely possible examples of implementations, merely set forth for a clear understanding of the principles of the invention. Many variations and modifications may be made to the above described embodiment(s) of the invention without departing substantially from the spirit and principles of the invention. All such modifications and variations are intended to be included herein within the scope of this disclosure and the present invention and are to be protected by the following claims.

The invention claimed is:

1. A digital subscriber line (DSL) apparatus comprising:
   logic configured to provide a first DSL loaded loop modulation over a first Loop segment with a plurality of load coils; and
   logic configured to provide a second DSL modulation over a second loop segment.

2. The apparatus of claim 1, wherein the second DSL modulation is ADSL.

3. The apparatus of claim 1, wherein the second DSL modulation is ReachDSL.

4. The apparatus of claim 1, wherein the second loop segment comprises one load coil.

5. The apparatus of claim 1, wherein the second loop segment carries communication of a native analog POTS interface in addition to DSL.

6. The apparatus of claim 5, wherein apparatus further comprises logic configuration to convert the communication of the native analog POTS interface to and from a digital interface.

7. A digital subscriber line (DSL) apparatus comprising:
   logic configured to provide a first DSL loaded loop modulation over a first Plurality of loop segments which each have a plurality of load coils;
   logic configured to inverse multiplex data across the first plurality of loop segments; and
   logic configured to provide a second DSL modulation over a second loop segment.

8. The apparatus of claim 7, wherein the second loop segment comprises one load coil.

9. The apparatus of claim 7, wherein the second loop segment carries communication of a native analog POTS interface in addition to DSL.

10. The apparatus of claim 9, wherein the apparatus further comprises logic configured to convert the communication of the native analog POTS interface to and from a digital interface.

11. The apparatus of claim 7, further comprising: logic configured to provide the second DSL modulation over a third plurality of loop segments, wherein the third plurality of loops segments plus the second loop segment comprise more loop segments than the first plurality of loop segments resulting in pair gain.

12. A method of providing digital subscriber line (DSL) service, the method comprising the steps of: transmitting over a first loop segment with a plurality of load coils according to a first DSL loaded loop modulation; and transmitting over a second loop segment according to a second DSL modulation.

13. The method of claim 12, wherein the second DSL modulation is ADSL.

14. The method of claim 12, wherein the second DSL modulation is ReachDSL.

15. The method of claim 12, wherein the second loop segment comprises one load coil.

16. The method of claim 12, wherein the second loop segment carries communication of a native analog POTS interface in addition to DSL.

17. The method of claim 16, further comprising the step of converting the communication of the native analog POTS interface to and from a digital interface.

18. A method of providing digital subscriber line (DSL) service, the method comprising the steps of:
 transmitting over a first plurality of loop segments, which each have a plurality of load coils, according to a first DSL loaded loop modulation;
 inverse multiplexing data across the first plurality of loop segments; and
 transmitting over a second loop segment according to a second DSL modulation.

19. The method of claim 18, wherein the second loop segment comprises one load coil.

20. The method of claim 18, wherein the second loop segment carries communication of a native analog POTS interface in addition to DSL.

21. The method of claim 20, further comprising the step of converting the communication of the native analog POTS interface to and from a digital interface.

22. The method of claim 18, further comprising the step of:
 transmitting over a third plurality of loop segments according to the second DSL modulation, wherein the third plurality of loops segments plus the second loop segment comprise more loop segments than the first plurality of loop segments resulting in pair gain.

* * * * *